US010129766B2

(12) United States Patent
Chen et al.

(10) Patent No.: US 10,129,766 B2
(45) Date of Patent: Nov. 13, 2018

(54) QUALITY OF SERVICE MANAGEMENT METHODS, QUALITY OF SERVICE MANAGEMENT DEVICES AND QUALITY OF SERVICE MANAGEMENT SYSTEM

(71) Applicant: China Mobile Communications Corporation, Beijing (CN)

(72) Inventors: Zhuo Chen, Beijing (CN); Xiaowei Jiang, Beijing (CN); Xiaodong Xu, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 84 days.

(21) Appl. No.: 15/114,531

(22) PCT Filed: Dec. 29, 2014

(86) PCT No.: PCT/CN2014/095361
§ 371 (c)(1),
(2) Date: Jul. 27, 2016

(87) PCT Pub. No.: WO2015/109921
PCT Pub. Date: Jul. 30, 2015

(65) Prior Publication Data
US 2016/0345190 A1 Nov. 24, 2016

(30) Foreign Application Priority Data
Jan. 27, 2014 (CN) .......................... 2014 1 0038980

(51) Int. Cl.
H04W 24/02 (2009.01)
H04L 12/26 (2006.01)
(Continued)

(52) U.S. Cl.
CPC ............. *H04W 24/02* (2013.01); *H04L 43/16* (2013.01); *H04W 4/12* (2013.01); *H04W 28/0268* (2013.01); *H04W 88/06* (2013.01)

(58) Field of Classification Search
CPC ... H04W 24/02; H04W 28/0268; H04W 4/12; H04W 88/06; H04L 43/16
See application file for complete search history.

(56) References Cited

U.S. PATENT DOCUMENTS 8,565,755 B1 * 10/2013 Badakere Ramachandra .............
H04L 43/0817
370/230
9,807,248 B2 * 10/2017 Wei ........................ H04M 15/66
(Continued)

FOREIGN PATENT DOCUMENTS

CN 101325805 A 12/2008
CN 102870450 A 1/2013
(Continued)

OTHER PUBLICATIONS

Alcatel-Lucent "Discussion on the RRC protocol supporting dual connectivity 3GPP" TSG 1-15 RANWG2 Meeting #82 vol. R2-131962 May 24, 2013 (May 24, 2013) the whole document.
(Continued)

Primary Examiner — Jay P Patel
(74) Attorney, Agent, or Firm — Arch & Lake LLP

(57) ABSTRACT

The present disclosure provides QoS management methods, QoS management devices and a QoS management system. According to the present disclosure, with respect to a terminal in a dual-connectivity scenario, QoS parameter thresholds corresponding to a QoS parameter may be re-allocated to an MeNB and an SeNB for the terminal in accordance with an initial value corresponding to the QoS parameter of the terminal, so as to ensure that a QoS parameter value finally acquired by the terminal and corre- (Continued)

sponding to the QoS parameter does not exceed a numerical range defined by the initial value of the QoS parameter. As a result, it is able to match services provided to the terminal with the QoS that should have been possessed thereby in the case that the terminal is served by the MeNB and the SeNB, thereby to control the QoS of the terminal.

20 Claims, 9 Drawing Sheets

(51) Int. Cl.
*H04W 4/12* (2009.01)
*H04W 28/02* (2009.01)
*H04W 88/06* (2009.01)

(56) References Cited

U.S. PATENT DOCUMENTS

| | | | | |
|---|---|---|---|---|
| 2008/0291827 | A1* | 11/2008 | Xiong | H04L 45/00 370/230.1 |
| 2009/0196175 | A1* | 8/2009 | Sammour | H04W 36/02 370/230.1 |
| 2009/0245108 | A1* | 10/2009 | Wu | H04L 47/10 370/233 |
| 2010/0043053 | A1* | 2/2010 | Wei | H04L 47/10 726/1 |
| 2011/0080870 | A1 | 4/2011 | Bhalla et al. | |
| 2012/0158949 | A1* | 6/2012 | Lee | H04L 41/0896 709/224 |
| 2013/0114497 | A1* | 5/2013 | Zhang | H04W 72/005 370/312 |
| 2013/0287012 | A1* | 10/2013 | Pragada | H04W 76/045 370/338 |
| 2014/0003297 | A1 | 1/2014 | Uusitalo et al. | |
| 2014/0128075 | A1* | 5/2014 | Da Silva | H04W 36/30 455/436 |
| 2014/0220974 | A1* | 8/2014 | Hsu | H04W 36/0088 455/436 |
| 2014/0254476 | A1* | 9/2014 | Blankenship | H04L 47/20 370/328 |
| 2015/0085660 | A1* | 3/2015 | Harris | H04W 28/0268 370/235 |
| 2016/0066234 | A1* | 3/2016 | Cho | H04W 48/18 370/331 |
| 2016/0309379 | A1* | 10/2016 | Pelletier | H04W 76/022 |
| 2016/0338130 | A1* | 11/2016 | Park | H04W 76/021 |

FOREIGN PATENT DOCUMENTS

| | | |
|---|---|---|
| CN | 103052116 A | 4/2013 |
| CN | 103874128 A | 6/2014 |
| EP | 2753035 A2 | 7/2014 |
| WO | 2013053339 A2 | 4/2013 |
| WO | 2013104416 A1 | 7/2013 |

OTHER PUBLICATIONS

International Search Report for International Application No. PCT/CN2014/095361 dated Apr. 1, 2015.
Ericsson, Analysis of Architectural/System Impacts from Dual Connectivity, SA WG2 Meeting #101, S2-140098, Jan. 2014, 4 pages.
Ericsson, UE-AMBR Allocation in the Context of DC Scenarios, 3GPP TSG-RAN WG3 Meeting #83, R3-140347, Feb. 2014, 5 pages.
Intel Corporation, Impacts of Splitting a Single EPS Bearer Between Two (or More) eNBs, 3GPP TSG RAN WG2 Meeting #81 bis, R2-131529, Apr. 2013, 10 pages.
Samsung, On the UE-AMBR in Dual Connectivity, 3GPP TSG RAN WG2 #85, R2-140413, Feb. 2014, 3 pages.
European Patent Office, Extended European Search Report, Application No. 14879331.8, dated Aug. 14, 2017, 15 pages.
The State Intellectual Property Office of People's Republic of China, First Office Action and Search Report, Application No. 201410038980.4, dated Oct. 10, 2017, 18 pages.
PCT Written Opinion, Application No. PCT/CN2014/095361, dated Apr. 1, 2015, 17 pages.

\* cited by examiner

QUALITY OF SERVICE MANAGEMENT METHODS, QUALITY OF SERVICE MANAGEMENT DEVICES AND QUALITY OF SERVICE MANAGEMENT SYSTEM

CROSS-REFERENCE TO RELATED APPLICATION

The present application is the U.S. national phase of PCT Application No. PCT/CN2014/095361 filed on Dec. 29, 2014, which claims a priority of the Chinese Patent Application No. 201410038980.4 filed before the SIPO on Jan. 27, 2014 and entitled "Quality of Service (QoS) Management Methods, QoS Management Devices and QoS Management System", which is incorporated herein by reference in its entirety.

TECHNICAL FIELD

The present disclosure relates to the field of communication technology, in particular to QoS management methods, QoS management devices and a QoS management system.

BACKGROUND

In order to effectively enhance a network coverage and a system capacity, the $3^{rd}$ Generation Partnership Project (3GPP) is currently studying the deployment of Small cells in a Long Term Evolution-Advanced (LTE-A) system. As compared with an original Macro evolved NodeB (eNB), the Small cell has relatively small transmission power and coverage. In addition, the small cell is usually deployed within the coverage of the Macro eNB, so as to enhance the network coverage and the system capacity.

In the case that a terminal (also called user equipment, UE) is located within the coverage of the Macro eNB and the Small cell, a Radio Resource Control (RRC) connection may be simultaneously maintained between the terminal and the two base stations, i.e., the terminal may be served by the Macro eNB and the Small cell at the same time, and two physical links may be maintained between the terminal and the Macro eNB and the Small cell. At this time, this network architecture may be called as dual-connectivity network architecture (as shown in FIG. 1). It should be appreciated that, through the dual-connectivity technique, it is able to effectively increase an uplink/downlink bit rate of the terminal, enhance the system capacity, optimize the signaling and improve the mobility robustness. It should be further appreciated that, in a dual-connectivity scenario where the terminal is served by the Macro eNB and the Small cell, one of them may be taken as a Master eNB (MeNB) for the terminal, and the other may be taken as a Secondary eNB (SeNB) for the terminal. The MeNB is mainly used to assist the terminal in the management of control plane-related information, and the SeNB is mainly used to provide the terminal with corresponding radio resources. FIG. 2 shows the data transmission for a user plane and the control plane of the terminal during the dual-connectivity state. In FIG. 2, the macro cell is the MeNB, and the small cell is the SeNB.

In other words, as shown in FIG. 2, in accordance with the conventional dual-connectivity architecture, in the case that the terminal accesses a network, core network control nodes, for example, a Mobility Management Entity (MME), may issue information, such as a service bearer desired to be established by the terminal and corresponding QoS parameters for granting the QoS of the terminal (e.g., UE-Aggregate Maximum Bit Rate (UE-AMBR, which is suitable for the bearer with a non-granted bit rate and which may further include UE-AMBR in an uplink direction from the terminal to the base station and UE-AMBR in a downlink direction from the base station to the terminal), Maximum Bit Rate (MBR, which is suitable for the bearer with a granted bit rate and which may further include MBR in the uplink direction from the terminal to the base station and MBR in the downlink direction from the base station to the terminal), and Granted Bit Rate (GBR, which is suitable for the bearer with a granted bit rate and which may further include GBR in the uplink direction from the terminal to the base station and MBR in the downlink direction from the base station to the terminal)), to the MeNB that assists the terminal in the management of control plane-related information, rather than to the SeNB. In this regard, the SeNB does not have the information about the QoS parameters. Therefore, in the case that the terminal is served by the MeNB and the SeNB simultaneously in the dual-connectivity scenario, a service provided to the terminal may not match the QoS that should have been possessed thereby. For example, the terminal may acquire an overall bit rate greater than the UE-AMBR, or a maximum bit rate greater than the MBR, resulting in a waste of the network resources, and a decrease in an overall resource utilization rate as well as the overall performance of the network.

SUMMARY

An object of the present disclosure is to provide QoS management methods, QoS management devices and a QoS management system, so as to enable a service provided to a terminal to match the QoS that should have been possessed thereby in a dual-connectivity scenario.

In one aspect, the present disclosure provides in some embodiments a QoS management method, including steps of: with respect to a terminal in a dual-connectivity scenario, acquiring, by a network control entity, initial values corresponding to QoS parameters of the terminal; and with respect to any one of the QoS parameters, determining, in accordance with the initial value corresponding to the QoS parameter, QoS parameter thresholds corresponding to the QoS parameter and capable of being used by an MeNB and an SeNB which provide services to the terminal, so that the MeNB and the SeNB use respective QoS parameter values within respective numerical ranges defined by the respective QoS parameter thresholds corresponding to the QoS parameter and capable of being used by the MeNB and the SeNB to provide corresponding services to the terminal. A sum of the determined QoS parameter thresholds corresponding to the QoS parameter and capable of being used by the MeNB and the SeNB does not exceed a numerical range defined by the initial value corresponding to the QoS parameter.

In another aspect, the present disclosure provides in some embodiments a QoS management method, including steps of: with respect to a terminal in a dual-connectivity scenario, acquiring, by a base station which provides services to the terminal, QoS parameter thresholds corresponding to QoS parameters of the terminal, capable of being used by the base station and determined by a network control entity for the base station; and with respect to any one of the QoS parameters, providing, in accordance with the QoS parameter threshold corresponding to the QoS parameter, capable of being used by the base station and determined by the network control entity for the base station, a corresponding service to the terminal using a QoS parameter value within a numerical range defined by the QoS parameter threshold corresponding to the QoS parameter and capable of being used by the base station. A sum of the QoS parameter threshold corresponding to the QoS parameters, capable of being used by the base station and determined by the network control entity for the base station, and a QoS parameter threshold corresponding to the QoS parameter, capable of being used by a further base station which cooperates with the base substation to provide a service to the terminal and determined by the network control entity for the further base station, does not exceed a numerical range defined by an initial value corresponding to the QoS parameter of the terminal acquired by the network control entity.

In yet another aspect, the present disclosure further provides in some embodiments a network control entity, including: an acquisition unit configured to, with respect to a terminal in a dual-connectivity scenario, acquire initial values corresponding to QoS parameters of the terminal; and a determination unit configured to, with respect to any one of the QoS parameters, determine, in accordance with the initial value corresponding to the QoS parameter, QoS parameter thresholds corresponding to the QoS parameter and capable of being used by an MeNB and an SeNB which provide services to the terminal, so that the MeNB and the SeNB use respective QoS parameter values within respective numerical ranges defined by the respective QoS parameter thresholds corresponding to the QoS parameter and capable of being used by the MeNB and the SeNB to provide corresponding services to the terminal. A sum of the determined QoS parameter thresholds corresponding to the QoS parameter and capable of being used by the MeNB and the SeNB does not exceed a numerical range defined by the initial value corresponding to the QoS parameter.

In still yet another aspect, the present disclosure provides in some embodiments a base station, including: an acquisition unit configured to, with respect to a terminal in a dual-connectivity scenario, acquire QoS parameter thresholds corresponding to QoS parameters of the terminal, capable of being used by the base station, and determined by a network control entity for the base station; and an execution unit configured to, with respect to any one of the QoS parameter, provide, in accordance with the QoS parameter threshold corresponding to the QoS parameter, capable of being used by the base station, and determined by the network control entity for the base station, a corresponding service to the terminal using a QoS parameter value within a numerical range defined by the QoS parameter threshold corresponding to the QoS parameter and capable of being used by the base station. A sum of the QoS parameter threshold corresponding to the QoS parameter, capable of being used by the base station, and determined by the network control entity for the base station, and a QoS parameter threshold corresponding to the QoS parameter, capable of being used by a further base station which cooperates with the base substation to provide a service to the terminal, and determined by the network control entity for the further base station does not exceed a numerical range defined by an initial value corresponding to the QoS parameter of the terminal acquired by the network control entity.

In still yet another aspect, the present disclosure provides in some embodiments a QoS management system, including a terminal, a network control entity, and an MeNB and an SeNB which provide services to the terminal. The network control entity is configured to, with respect to a terminal in a dual-connectivity scenario, acquire initial values corresponding to QoS parameters of the terminal; and with respect to any one of the QoS parameters, determine, in accordance with the initial value corresponding to the QoS parameter, QoS parameter thresholds corresponding to the QoS parameter and capable of being used by the MeNB and the SeNB which provide services to the terminal, so that the MeNB and the SeNB use respective QoS parameter values within respective numerical ranges defined by the respective QoS parameter thresholds corresponding to the QoS parameter and capable of being used by the MeNB and the SeNB to provide corresponding services to the terminal. A sum of the determined QoS parameter thresholds corresponding to the QoS parameter and capable of being used by the MeNB and the SeNB does not exceed a numerical range defined by the initial value corresponding to the QoS parameter.

According to the QoS management methods, the QoS management devices and the QoS management system in the embodiments of the present disclosure, with respect to the terminal in the dual-connectivity scenario, the QoS parameter thresholds corresponding to the QoS parameter may be re-allocated to the MeNB and the SeNB for the terminal in accordance with the acquired initial value corresponding to the QoS parameter of the terminal, so as to ensure that the QoS parameter value finally acquired by the terminal and corresponding to the QoS parameter does not exceed the numerical range defined by the initial value of the QoS parameter. As a result, it is able to match the service provided to the terminal with the QoS that should have been possessed thereby in the case that the terminal is served by the MeNB and the SeNB, thereby to control the QoS of the terminal.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 12(*b*) is another schematic view showing the QoS management system according to the sixth embodiment of the present disclosure.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

First Embodiment

Figure 1:
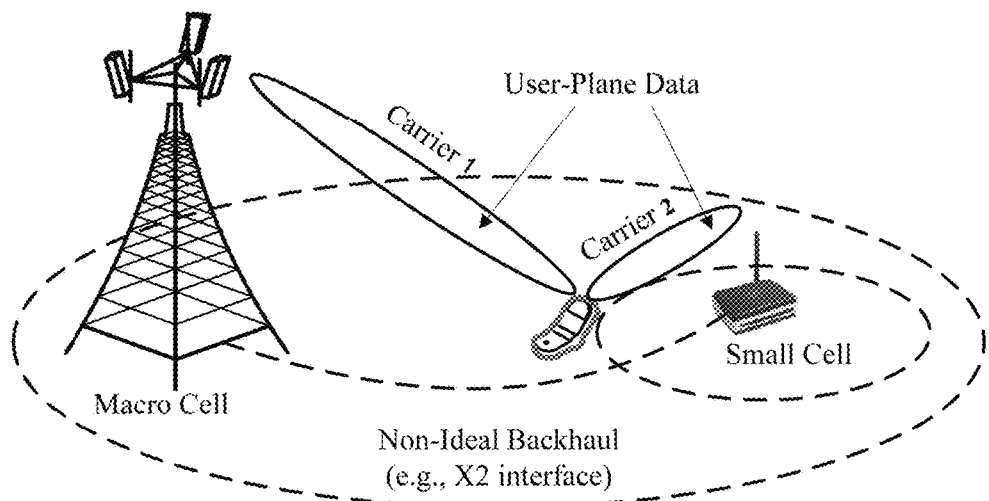
FIG. 1 is a schematic view showing dual-connectivity network architecture in the related art.
Figure 2:
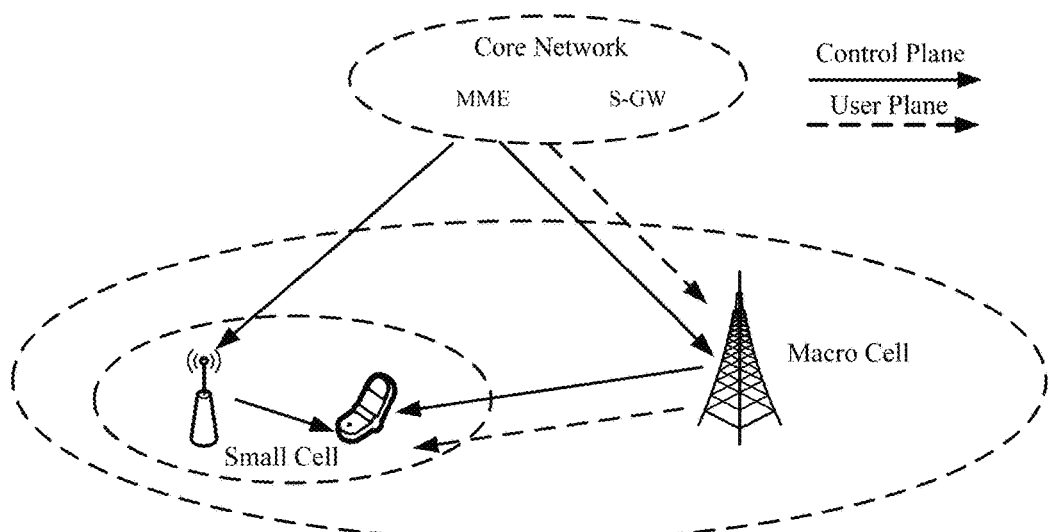
FIG. 2 is a schematic view showing the data transmission for a user plane and a control plane of a terminal in the related art where a dual-connectivity technique is used.
Figure 3:
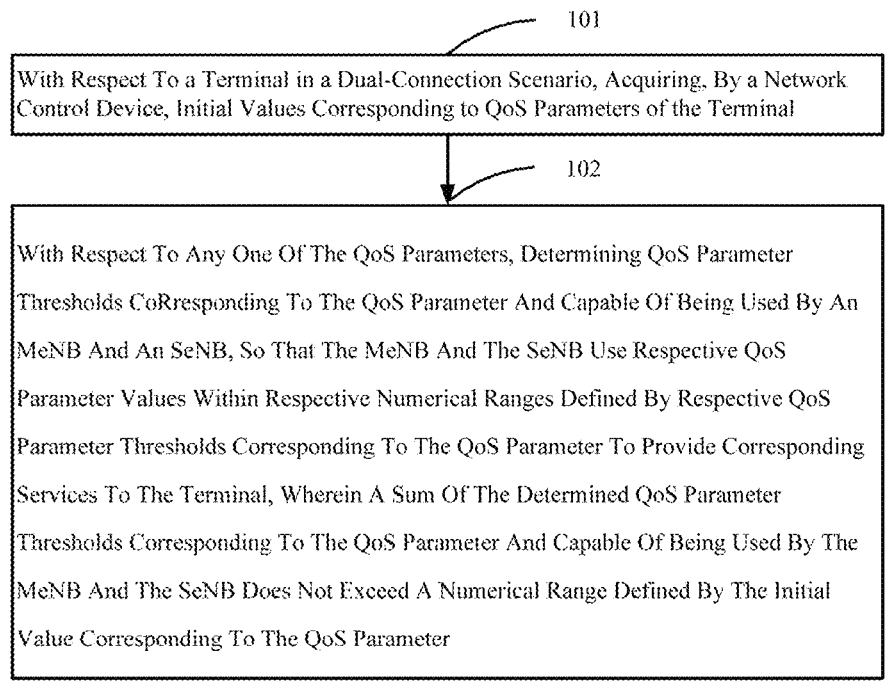
FIG. 3 is a flow chart of a QoS management method according to the first embodiment of the present disclosure.

The present disclosure provides in this embodiment a QoS management method which, as shown in FIG. 3, may include the following steps.

Step 101: with respect to a terminal in a dual-connectivity scenario, acquiring, by a network control entity, initial values corresponding to QoS parameters of the terminal.

To be specific, in the first embodiment of the present disclosure, the network control entity may acquire the initial values corresponding to the QoS parameters of the terminal from a network entity (e.g., MME) for storing terminal subscription data and service types.

Further, in the first embodiment of the present disclosure, the network control entity may be an independent device (e.g., an MeNB or a serving gateway (SGW) of a core network that provides services to the terminal), or a device integrated into the independent device. Generally, the QoS parameters may include one or more of UE-AMBR, MBR and GBR.

Step 102: with respect to any one of the QoS parameters, determining by the network control entity, in accordance with the initial value corresponding to the QoS parameter, QoS parameter thresholds corresponding to the QoS parameter and capable of being used by an MeNB and an SeNB which provide services to the terminal, so that the MeNB and the SeNB use QoS parameter values within a numerical range defined by the QoS parameter thresholds corresponding to the QoS parameter to provide corresponding services to the terminal. A sum of the determined QoS parameter thresholds corresponding to the QoS parameter and capable of being used by the MeNB and the SeNB does not exceed a numerical range defined by the initial value corresponding to the QoS parameter.

It should be appreciated that, generally, that the sum of the determined QoS parameter thresholds corresponding to the QoS parameter and capable of being used by the MeNB and the SeNB does not exceed a numerical range defined by the initial value corresponding to the QoS parameter refers to that, the sum of the determined QoS parameter thresholds corresponding to the QoS parameter and capable of being used by the MeNB and the SeNB is located within the numerical range defined by the initial values corresponding to the QoS parameter.

For example, the QoS parameter such as UE-AMBR or MBR is used to define an upper limit of a bit rate capable of being used by the terminal. Therefore, with respect to the QoS parameter such as UE-AMBR or MBR, the QoS parameter thresholds corresponding to the QoS parameter and capable of being used by the MeNB and the SeNB are just the corresponding upper limits. At this time, that the sum of the determined QoS parameter thresholds corresponding to the QoS parameter and capable of being used by the MeNB and the SeNB does not exceed a numerical range defined by the initial value corresponding to the QoS parameter generally refers to that, the sum of the determined QoS parameter thresholds corresponding to the QoS parameter and capable of being used by the MeNB and the SeNB is located within the numerical range defined by the initial value corresponding to the QoS parameter, i.e., not greater than the initial value corresponding to the QoS parameter.

For another example, the QoS parameter such as GBR is used to define a lower limit of a bit rate capable of being used by the terminal. Therefore, with respect to the QoS parameter such as GBR, the QoS parameter thresholds corresponding to the QoS parameter and capable of being used by the MeNB and the SeNB are just the corresponding lower limits. At this time, that the sum of the determined QoS parameter thresholds corresponding to the QoS parameter and capable of being used by the MeNB and the SeNB does not exceed a numerical range defined by the initial value corresponding to the QoS parameter generally refers to that, the sum of the determined QoS parameter thresholds corresponding to the QoS parameter and capable of being used by the MeNB and the SeNB is located within the numerical range defined by the initial value corresponding to the QoS parameter, i.e., not smaller than the initial value corresponding to the QoS parameter.

Further, in the first embodiment of the present disclosure, with respect to any one of the QoS parameters, the QoS parameter thresholds corresponding to the QoS parameter and capable of being used by the MeNB and the SeNB may be determined by the network control entity in accordance with the initial value corresponding to the QoS parameter in the following modes.

Mode 1: with respect to any one of the QoS parameters, the QoS parameter thresholds corresponding to the QoS parameter and capable of being used by the MeNB and the SeNB may be designated in accordance with the initial value corresponding to the QoS parameter To be specific, with respect to any one of the QoS parameters, the QoS parameter thresholds corresponding to the QoS parameter and capable of being used by the MeNB and the SeNB may be designated in accordance with a predetermined QoS parameter configuration rule.

The QoS parameter thresholds corresponding to the QoS parameter and capable of being used by the MeNB and the SeNB may be specified in advance in the QoS parameter configuration rule (e.g., 30% of the initial value corresponding to the QoS parameter may be used by the MeNB and 70% of the initial value may be used by the SeNB), and they may be dynamically adjusted in accordance with the practice need.

Alternatively, a QoS parameter range corresponding to the QoS parameter and capable of being used by the MeNB or the SeNB may be determined in accordance with a load condition (or radio resources) of the MeNB or the SeNB, and then the QoS parameter threshold corresponding to the QoS parameter and capable of being used by the MeNB or the SeNB may be designated.

Mode 2: with respect to any one of the QoS parameters, the QoS parameter threshold corresponding to the QoS parameter and capable of being used by one of the MeNB and the SeNB may be designated in accordance with the initial value corresponding to the QoS parameter, and then the QoS parameter threshold corresponding to the QoS parameter and capable of being used by the other one of the MeNB and the SeNB may be determined in accordance with the initial value corresponding to the QoS parameter as well as the designated QoS parameter threshold for the one of the MeNB and the SeNB.

For example, in Mode 2, in the case that the network control entity is the MeNB, it may designate for the SeNB, with respect to any one of the QoS parameters, the QoS parameter threshold corresponding to the QoS parameter and capable of being used by the SeNB in accordance with the initial value corresponding to the QoS parameter, and then determine the QoS parameter threshold corresponding to the QoS parameter and capable of being used by the MeNB in accordance with the initial value corresponding to the QoS parameter as well as the designated QoS parameter threshold for the SeNB. In the case that the QoS parameter is UE-AMBR or MBR, a difference between the initial value corresponding to the QoS parameter and the QoS parameter threshold corresponding to the QoS parameter and designated for the SeNB, or a QoS parameter value smaller than the difference, may be taken as the QoS parameter threshold corresponding to the QoS parameter and capable of being used by the MeNB.

Mode 3: with respect to any one of the QoS parameters, QoS parameter thresholds corresponding to the QoS parameter and capable of being used by the MeNB and the SeNB may be received from the MeNB and the SeNB, and then these QoS parameter thresholds may be taken as the QoS parameter thresholds corresponding to QoS parameter and capable of being used by the MeNB and the SeNB.

It should be appreciated that, in Mode 3, the QoS parameter threshold corresponding to the QoS parameter and capable of being used by the MeNB or the SeNB may be designated for the MeNB or SeNB in accordance with its load condition (or radio resources), and then this QoS parameter threshold may be sent to the network control entity.

It should be further appreciated that, with respect to any one of the MeNB and the SeNB, before the QoS parameter threshold corresponding to the QoS parameter and capable of being used thereby is designated for the one of the MeNB and the SeNB, usually the initial value corresponding to the QoS parameter may be acquired from the network control entity. In this way, it is able to designate an appropriate QoS parameter threshold for the one of the MeNB and the SeNB in accordance with the initial value corresponding to the QoS parameter.

Mode 4: with respect to any one of the QoS parameters, the QoS parameter threshold corresponding to the QoS parameter and capable of being used by one of the MeNB and the SeNB may be received from the one of the MeNB and the SeNB, and then the QoS parameter threshold corresponding to the QoS parameter and capable of being used by the other one of the MeNB and the SeNB may be determined in accordance with the initial value corresponding to the QoS parameter as well as the received QoS parameter threshold.

For example, in Mode 4, in the case that the network control entity is the MeNB, it may receive from the SeNB, with respect to any one of the QoS parameters, the QoS parameter threshold corresponding to the QoS parameter and capable of being used by the SeNB, and then determine the QoS parameter threshold corresponding to the QoS parameter and capable of being used by the MeNB in accordance with the initial value corresponding to the QoS parameter as well as the received QoS parameter threshold for the SeNB. In the case that the QoS parameter is UE-AMBR or MBR, a difference between the initial value corresponding to the QoS parameter and the QoS parameter threshold corresponding to the QoS parameter and capable of being used by the SeNB, or a QoS parameter value smaller than the difference, may be taken as the QoS parameter threshold corresponding to the QoS parameter and capable of being used by the MeNB.

Further, in the first embodiment of the present disclosure, with respect to any one of the QoS parameters, after the network control entity has determined the QoS parameter thresholds corresponding to the QoS parameter and capable of being used by the MeNB and the SeNB which provide the services to the terminal in accordance with the acquired initial value corresponding to the QoS parameter, it may notify the MeNB and the SeNB of the QoS parameter thresholds respectively, so that the MeNB and the SeNB may provide the corresponding services to the terminal using a QoS parameter value within the numerical range defined by the QoS parameter thresholds corresponding to the QoS parameter and capable of being used by the MeNB and the SeNB.

For example, in the case that the QoS parameter is UE-AMBR or MBR, the MeNB and the SeNB may use QoS parameter values not greater than the QoS parameter thresholds corresponding to the QoS parameter and capable of being used thereby, so as to provide the corresponding services to the terminal. In the case that the QoS parameter is GBR, the MeNB and the SeNB may use QoS parameter values not smaller than the QoS parameter thresholds corresponding to the QoS parameter and capable of being used thereby, so as to provide the corresponding services to the terminal.

It should be further appreciated that, in the case that the network control entity is a third-party device such as SGW, it may exchange the relevant information (e.g., information about the QoS parameter) with the MeNB or the SeNB via an S1 interface. In the case that the network control entity is the MeNB or a device integrated into the MeNB, it may exchange the information with a base station cooperating therewith via an X2 interface between the MeNB and the SeNB or a third-party device such as SGW (at this time, the S1 interface may be used).

Further, in the first embodiment of the present disclosure, the method further includes a step of: with respect to any one of the QoS parameters, in the case that the QoS parameter value corresponding to the QoS parameter and currently used by one of the MeNB and the SeNB exceeds a numerical range defined by the QoS parameter threshold corresponding to the QoS parameter and capable of being by the one of the MeNB and the SeNB (e.g., greater than a corresponding upper limit or smaller than a corresponding lower limit), transmitting a first notification message to the other one of the MeNB and the SeNB, so as to instruct the other one of the MeNB and the SeNB to adjust the QoS parameter value corresponding to the QoS parameter and currently used by the other one of the MeNB and the SeNB in accordance with the first notification message in such a manner that a sum of the QoS parameter values corresponding to the QoS parameter and currently used by the MeNB and the SeNB does not exceed the numerical range defined by the initial value corresponding to the QoS parameter.

For example, in the case that the QoS parameter is UE-AMBR or MBR and the QoS parameter value corresponding to the QoS parameter and currently used by one of the MeNB and the SeNB is greater than the QoS parameter threshold corresponding to the QoS parameter and capable of being used by the one of the MeNB and the SeNB, the first notification message may be transmitted to the other one of the MeNB and the SeNB, so as to instruct it to perform downward adjustment on the QoS parameter value corresponding to the QoS parameter and currently used thereby in such a manner that the sum of the adjusted QoS parameter values corresponding to the QoS parameter and currently used by the MeNB and the SeNB does not exceed the numerical range defined by the initial value corresponding to the QoS parameter.

Alternatively, in the case that the QoS parameter is GBR and the QoS parameter value corresponding to the QoS parameter and currently used by one of the MeNB and the SeNB is smaller than the QoS parameter threshold corresponding to the QoS parameter and capable of being used by the one of the MeNB and the SeNB, the first notification message may be transmitted to the other one of the MeNB and the SeNB, so as to instruct it to perform upward adjustment on the QoS parameter value corresponding to the QoS parameter and currently used thereby in such a manner that the sum of the adjusted QoS parameter values corresponding to the QoS parameter and currently used by the MeNB and the SeNB does not exceed the numerical range defined by the initial value corresponding to the QoS parameter.

It should be appreciated that, after the other one of the MeNB and the SeNB is instructed to adjust the QoS parameter value corresponding to the QoS parameter and currently used thereby in accordance with the first notification message, the QoS parameter thresholds corresponding to the QoS parameter and capable of being used by the MeNB and the SeNB may be re-adjusted in accordance with the QoS parameter values corresponding to the QoS parameter and currently used by the MeNB and the SeNB.

Alternatively, the method may further include a step of: receiving a second notification message from one of the MeNB and the SeNB, and instructing, in accordance with the second notification message, the other one of the MeNB and the SeNB to adjust the QoS parameter value corresponding to the QoS parameter and currently used thereby in such manner that a sum of the adjusted QoS parameter values corresponding to the QoS parameter and currently used by the MeNB and the SeNB does not exceed the numerical range defined by the initial value corresponding to the QoS parameter. The second notification message is transmitted by the one of the MeNB and the SeNB to the network control entity in the case that the QoS parameter value corresponding to the QoS parameter and currently used thereby exceeds the numerical range defined by the QoS parameter threshold corresponding to the QoS parameter and capable of being used by the one of the MeNB and the SeNB.

Similarly, after the other one of the MeNB and the SeNB is instructed to adjust, in accordance with the second notification message, the QoS parameter value corresponding to the QoS parameter and currently used thereby, the QoS parameter thresholds corresponding to the QoS parameter and capable of being used by the MeNB and the SeNB may be re-adjusted in accordance with the QoS parameter values corresponding to the QoS parameter and currently used by the MeNB and the SeNB.

For example, in the case that the network control entity is the MeNB and, with respect to any one of the QoS parameters, the QoS parameter value corresponding to the QoS parameter and currently used by the MeNB exceeds to the numerical range defined by the QoS parameter threshold corresponding to the QoS parameter and capable of being used by the MeNB, it may transmit the first notification message to the SeNB, so as to instruct the SeNB to adjust, in accordance with the first notification message, the QoS parameter value corresponding to the QoS parameter and currently used by the SeNB in such a manner that a sum of the adjusted QoS parameter values corresponding to the QoS parameter and currently used by the MeNB and the SeNB does not exceed the numerical range defined by the initial value corresponding to the QoS parameter. It should be appreciated that, after the SeNB is instructed to adjust, in accordance with the first notification message, the QoS parameter value corresponding to the QoS parameter and currently used by the SeNB, the QoS parameter thresholds corresponding to the QoS parameter and capable of being used by the MeNB and the SeNB may be re-adjusted in accordance with the QoS parameter values corresponding to the QoS parameter and currently used by the MeNB and the SeNB.

Alternatively, the method may further include a step of receiving a second notification message from the SeNB, and adjusting, in accordance with the second notification message, the QoS parameter value corresponding to the QoS parameter and currently used by the MeNB in such a manner that a sum of the adjusted QoS parameter values corresponding to the QoS parameter and currently used by the MeNB and the SeNB does not exceed the numerical range defined by the initial value corresponding to the QoS parameter. At this time, the second notification message may be transmitted by the SeNB to the MeNB in the case that the QoS parameter value corresponding to the QoS parameter and currently used by the SeNB exceeds the numerical range defined by the QoS parameter threshold corresponding to the QoS parameter and capable of being used by the SeNB. Similarly, after the MeNB is instructed, in accordance with the second notification message, to adjust the QoS parameter value corresponding to the QoS parameter and currently used thereby, the QoS parameter thresholds corresponding to the QoS parameter and capable of being used by the MeNB and the SeNB may be re-adjusted in accordance with the QoS parameter values corresponding to the QoS parameter and currently used by the MeNB and the SeNB.

In other words, in the case that each of the QoS parameter values currently used by the MeNB and the SeNB does not exceed the corresponding QoS parameter threshold, the MeNB and SeNB may continue to provide the services to the terminal independently. In the case that the QoS parameter value currently used by one of the MeNB and the SeNB (e.g., the MeNB) exceeds the corresponding QoS parameter threshold, the other one of the MeNB and SeNB (e.g., the SeNB) may be notified and instructed to perform downward or upward adjustment on the QoS parameter value currently used thereby, so that at any time point, the sum of the QoS parameter values corresponding to the QoS parameter and currently used by the MeNB and the SeNB does not exceed the numerical range defined by the initial value corresponding to the QoS parameter.

Further, the first notification message may carry a QoS parameter-value adjustment amount or adjustment step size. At this time, the step of transmitting the first notification message to the other one of the MeNB and the SeNB so as to instruct it to adjust, in accordance with the first notification message, the QoS parameter value corresponding to the QoS parameter and currently used by the other one of the MeNB and the SeNB may include: transmitting the first notification message to the other one of the MeNB and the SeNB so as to instruct it to adjust, in accordance with the QoS parameter-value adjustment amount or adjustment step size carried in the first notification message, the QoS parameter value corresponding to the QoS parameter and currently used by the other one of the MeNB and the SeNB.

Correspondingly, the second notification message may also carry the QoS parameter-value adjustment amount or adjustment step size. At this time, the step of transmitting the second notification message to one of the MeNB and the SeNB so as to instruct it to adjust, in accordance with the second notification message, the QoS parameter value corresponding to the QoS parameter and currently used by the other one of the MeNB and the SeNB may include: receiving the second notification message from the one of the MeNB and the SeNB, so as to instruct the other one of the MeNB and the SeNB to adjust, in accordance with the QoS parameter-value adjustment amount or adjustment step size carried in the second notification message, the QoS parameter value corresponding to the QoS parameter and currently used by the other one of the MeNB and the SeNB.

Further, in this embodiment of the present disclosure, with respect to any one of the QoS parameters representing a data transmission characteristic in a downlink direction, the step of determining the QoS parameter thresholds corresponding to the QoS parameter and capable of being used by the MeNB and the SeNB in accordance with the initial value corresponding to the QoS parameter may also include: in the case that data streams to be distributed by the MeNB and the SeNB to the terminal are allocated by the MeNB (i.e., the data streams are allocated via a wireless network), determining the QoS parameter thresholds corresponding to the QoS parameter and capable of being used by the MeNB and the SeNB in accordance with the data streams received by the MeNB and SeNB from the MeNB and bit rates of the received data streams. Alternatively, at this time, this step may generally be executed by the MeNB. In addition, in the case that the MeNB allocates the data stream to the SeNB in accordance with the initial value corresponding to the QoS parameter, the bit rate of the data stream may be appropriately decreased or increased, so as to control the bit rate of the data stream transmitted from the SeNB to the terminal within a reasonable range (i.e., the bit rate does not exceed the numerical range defined by the initial value corresponding to the QoS parameter).

Alternatively, the step of determining the QoS parameter thresholds corresponding to the QoS parameter and capable of being used by the MeNB and the SeNB in accordance with the initial value corresponding to the QoS parameter may also include, in the case that the data streams to be distributed by the MeNB and the SeNB to the terminal are allocated via an SGW (i.e., the data streams are allocated via a core network), determining the QoS parameter thresholds corresponding to the QoS parameter and capable of being used by the MeNB and the SeNB in accordance with the data streams received by the MeNB and SeNB from the SGW and bit rates of the received data streams. Alternatively, at this time, this step may generally be executed by the SGW. In addition, in the case that the SGW allocates the data streams to the MeNB and the SeNB in accordance with the initial value corresponding to the QoS parameter, the bit rates of the data streams may be appropriately decreased or increased, so as to control the bit rates of the data streams transmitted from the MeNB and the SeNB to the terminal within a reasonable range (i.e., the bit rate does not exceed the numerical range defined by the initial value corresponding to the QoS parameter).

Alternatively, the step of determining the QoS parameter thresholds corresponding to the QoS parameter and capable of being used by the MeNB and the SeNB in accordance with the initial value corresponding to the QoS parameter may also include, in the case that the data streams to be distributed by the MeNB and the SeNB to the terminal are allocated via the MeNB and the SGW, determining the QoS parameter threshold corresponding to the QoS parameter and capable of being used by the SeNB in accordance with the overall data stream received by the SeNB from the MeNB and the SGW and a bit rate of the received overall data stream, and determining the QoS parameter threshold corresponding to the QoS parameter and capable of being used by the MeNB in accordance with a data stream received by the MeNB from the SGW, a bit rate of the data stream received from the SGW, a data stream allocated by the MeNB to the SeNB and a bit rate of the data stream allocated to the SeNB.

According to the QoS management method in the first embodiment of the present disclosure, with respect to the terminal in the dual-connectivity scenario, the QoS parameter thresholds corresponding to the QoS parameters may be re-allocated to the MeNB and the SeNB for the terminal in accordance with the acquired initial values corresponding to the QoS parameters of the terminal, so as to ensure that the QoS parameter values finally acquired by the terminal and corresponding to the QoS parameters do not exceed the numerical range defined by the initial values of the QoS parameters. As a result, it is able to match the service provided to the terminal with the QoS that should have been possessed thereby in the case that the terminal is served by the MeNB and the SeNB, thereby to control the QoS of the terminal.

Second Embodiment

The QoS management method in the first embodiment will be described hereinafter in the case that the method is carried by the network control entity.

Figure 4:
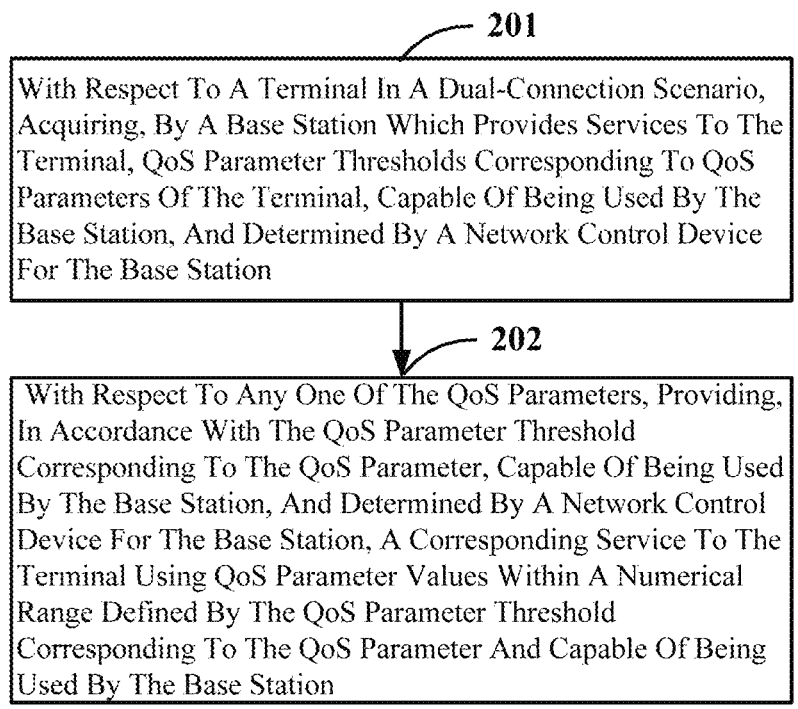
FIG. 4 is a flow chart of a QoS management method according to the second embodiment of the present disclosure.

As shown in FIG. 4, the QoS management method in this embodiment may include the following steps.

Step 201: with respect to a terminal in a dual-connectivity scenario, acquiring, by a base station which provides services to the terminal, QoS parameter thresholds corresponding to QoS parameters of the terminal, capable of being used by the base station and determined by the network control entity for the base station.

To be specific, the QoS parameters may include one or more of UE-AMBR, MBR and GBR.

In addition, in the case that the network control entity is a third-party device such as an SGW, the steps in this embodiment may be executed by the MeNB or SeNB that provides services to the terminal, and in the case that the network control entity is the MeNB, the steps in this embodiment may generally be executed by the SeNB.

Step 202: with respect to any one of the QoS parameters, providing, in accordance with the QoS parameter threshold corresponding to the QoS parameter, capable of being used by the base station and determined by the network control entity for the base station, a corresponding service to the terminal using a QoS parameter value within a numerical range defined by the QoS parameter threshold corresponding to the QoS parameter and capable of being used by the base station.

A sum of the QoS parameter threshold corresponding to the QoS parameters and capable of being used by the base station from the network control entity and a QoS parameter threshold corresponding to the QoS parameter, capable of being used by a further base station which cooperates with the base substation to provide a service to the terminal, and determined by the network control entity for the further base station, does not exceed a numerical range defined by initial value corresponding to the QoS parameter of the terminal acquired by the network control entity.

In this embodiment of the present disclosure, prior to the step of, with respect to any one of the QoS parameters, acquiring by the base station the QoS parameter threshold corresponding to the QoS parameter, capable of being used by the base station and determined by the network control entity for the base station, the method may further include: returning to the network control entity the QoS parameter threshold corresponding to the QoS parameter and capable of being used by the base station, so that the network control entity may determine, for the base station, the QoS parameter threshold corresponding to the QoS parameter and capable of being used by the base station in accordance with the returned QoS parameter threshold corresponding to the QoS parameter and capable of being used by the base station.

In the second embodiment of the present disclosure, the method may further include: receiving from the network control entity a first notification message, and adjusting, in accordance with the first notification message, the QoS parameter value corresponding to the QoS parameter and currently used by the base station in such a manner that a sum of the QoS parameter values corresponding to the QoS parameter and currently used by the base station and the further base station does not exceed the numerical range defined by the initial value corresponding to the QoS parameter. The first notification message is transmitted by the network control entity to the base station in the case that the network control entity determines that the QoS parameter value corresponding to the QoS parameter and currently used by the further base station exceeds a numerical range defined by the QoS parameter value corresponding to the QoS parameter and capable of being used by the further base station.

Alternatively, the method may further include, in the case that, with respect to any one of the QoS parameters, the QoS parameter value corresponding to the QoS parameter and currently used by the base station exceeds the numerical range defined by the QoS parameter threshold corresponding to the QoS parameter and capable of being used by the base station, transmitting to the network control entity a second notification message, so as to instruct by the network control entity the further base station to adjust, in accordance with the second notification message, the QoS parameter value corresponding to the QoS parameter and currently used by the further base station in such a manner that a sum of the adjusted QoS parameter values corresponding to the QoS parameter and currently used by the base station and the further base substrate does not exceed the numerical range defined by the initial value corresponding to the QoS parameter.

Generally, the first notification message may carry a QoS parameter-value adjustment amount or adjustment step size. At this time, the step of receiving the first notification message from the network control entity and adjusting, in accordance with the first notification message, the QoS parameter value corresponding to the QoS parameter and currently used by the base station may include: receiving from the network control entity the first notification message, and adjusting, in accordance with the QoS parameter-value adjustment amount or adjustment step size carried in the first notification message, the QoS parameter value corresponding to the QoS parameter and currently used by the base station.

Correspondingly, the second notification message may also carry the QoS parameter-value adjustment amount or adjustment step size. At this time, the step of transmitting to the network control entity, so as to instruct by the network control entity the further base station, in accordance with the second notification message, to adjust the QoS parameter value corresponding to the QoS parameter and currently used by the further base station may include: transmitting to the network control entity the second notification message, so as to instruct by the network control entity the further base station to adjust, in accordance with the QoS parameter-value adjustment amount or adjustment step size carried in the second notification message, the QoS parameter value corresponding to the QoS parameter and currently used by the further base station.

According to the QoS management method in the second embodiment of the present disclosure, with respect to the terminal in the dual-connectivity scenario, the QoS parameter thresholds corresponding to the QoS parameter may be re-allocated to the MeNB and the SeNB for the terminal in accordance with the acquired initial value corresponding to the QoS parameter of the terminal, so as to ensure that the QoS parameter value finally acquired by the terminal and corresponding to the QoS parameter does not exceed the numerical range defined by the initial value of the QoS parameter. As a result, it is able to match the service provided to the terminal with the QoS that should have been possessed thereby in the case that the terminal is served by the MeNB and the SeNB, thereby to control the QoS of the terminal.

Third Embodiment

The present disclosure provides in this embodiment several types of the QoS management method on the basis of the concept given in the first or second embodiment, and they will be described hereinafter with reference to FIGS. 5-9.

QoS Management Method of a First Type

Figure 5:
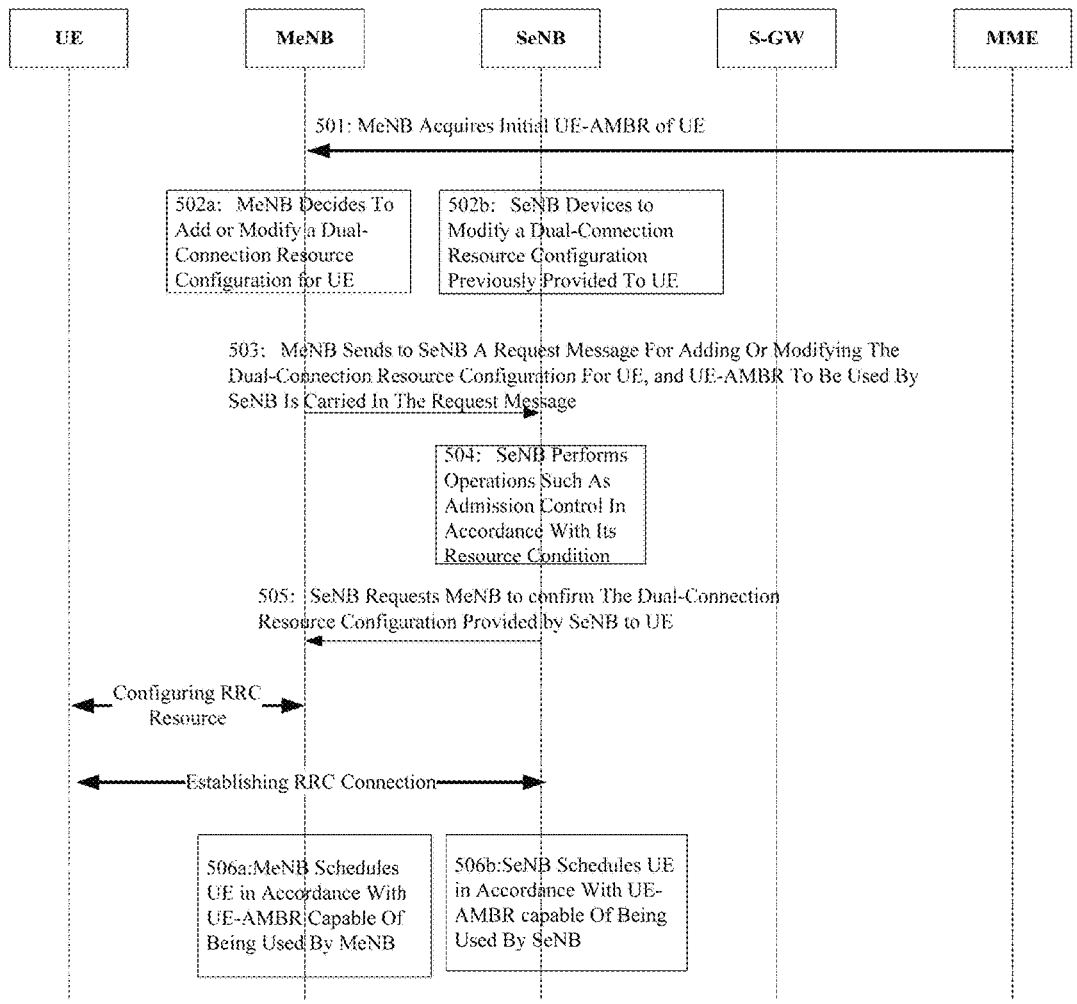
FIG. 5 is a flow chart of a QoS management method according to the third embodiment of the present disclosure.

In the QoS management method in FIG. 5, the network control entity is an MeNB, and the QoS parameter is a UE-AMBR. UE-AMBR thresholds corresponding to the MeNB and the SeNB may be determined as follows.

After receiving an initial UE-AMBR of a User Equipment (UE) from an MME, the MeNB designates for the SeNB a UE-AMBR to be used by the SeNB (e.g., UE-AMBR of SeNB), and at this time, a UE-AMBR capable of being used by the MeNB is a difference between the initial UE-AMBR of the UE and the UE-AMBR of the SeNB, or a value less than this difference. In addition, the MeNB may modify the UE-AMBR currently used by the SeNB at any time. However, at any time point, a sum of the UE-AMBR currently used by the MeNB and the UE-AMBR currently used by the SeNB shall not exceed the initial UE-AMBR acquired from the MME.

To be specific, as shown in FIG. 5, the QoS management method may include the following steps.

Step 501: the MeNB acquires the initial UE-AMBR of the UE. To be specific, the MeNB may initiate an initial UE context setup request to the MME and receive an initial UE context response message from the MME, so as to acquire the initial UE-AMBR of the UE from the MME.

Step 502a: the MeNB decides to add or modify a dual-connectivity resource configuration for the UE (RRM Decision to add/modify SeNB resources), or Step 502b: the SeNB decides to modify a dual-connectivity resource configuration previously provided to the UE (RRC Decision to modify SeNB resources).

Step 503: in the case that the MeNB sends to the SeNB a request message for adding or modifying the dual-connectivity resource configuration for the UE (SeNB Addition/Modification Request), the MeNB notifies the SeNB of a service bearer for the resources desired to be provided by the SeNB and the UE-AMBR to be used by the SeNB is carried in the request message, i.e., the MeNB notifies the SeNB of the UE-AMBR threshold capable of being used by the SeNB.

It should be appreciated that, in this embodiment, in the case that the MeNB requests the SeNB to add or modify the dual-connectivity resource configuration for the UE, the MeNB may send the request message in the form of, but not limited to, SeNB Addition/Modification Request.

Step 504: the SeNB performs operations such as admission control in accordance with its resource condition.

Step 505: the SeNB requests the MeNB to confirm the dual-connectivity resource configuration provided by the SeNB to the UE (SeNB Addition/Modification Command), and then the RRC connection with the UE may be configured for the MeNB (RRC Reconfig), so as to establish the RRC connections between the MeNB and the UE, and between the SeNB and the UE.

Step 506: the MeNB and the SeNB perform the corresponding processings in accordance with the UE-AMBRs determined in the above steps. A sum of the UE-AMBRs used by the MeNB and the SeNB shall not exceed the initial UE-AMBR of the UE (i.e., an initial value of the UE-AMBR acquired by the MeNB from the MME). To be specific, Step 506 may include the following steps.

Step 506a: the MeNB schedules the UE in accordance with the UE-AMBR capable of being used by the MeNB. At this time, the UE-AMBR capable of being used by the MeNB shall not be greater than a value obtained by subtracting the UE-AMBR capable of being used by the SeNB from the initial UE-AMBR of the UE.

Step 506b: the SeNB schedules the UE in accordance with the UE-AMBR capable of being used by the SeNB. At this time, the UE-AMBR capable of being used by the SeNB shall not be greater than the UE-AMBR allocated by the MeNB to the SeNB, i.e., the UE-AMBR designated by the MeNB for the SeNB.

QoS Management Method of a Second Type

Figure 6:
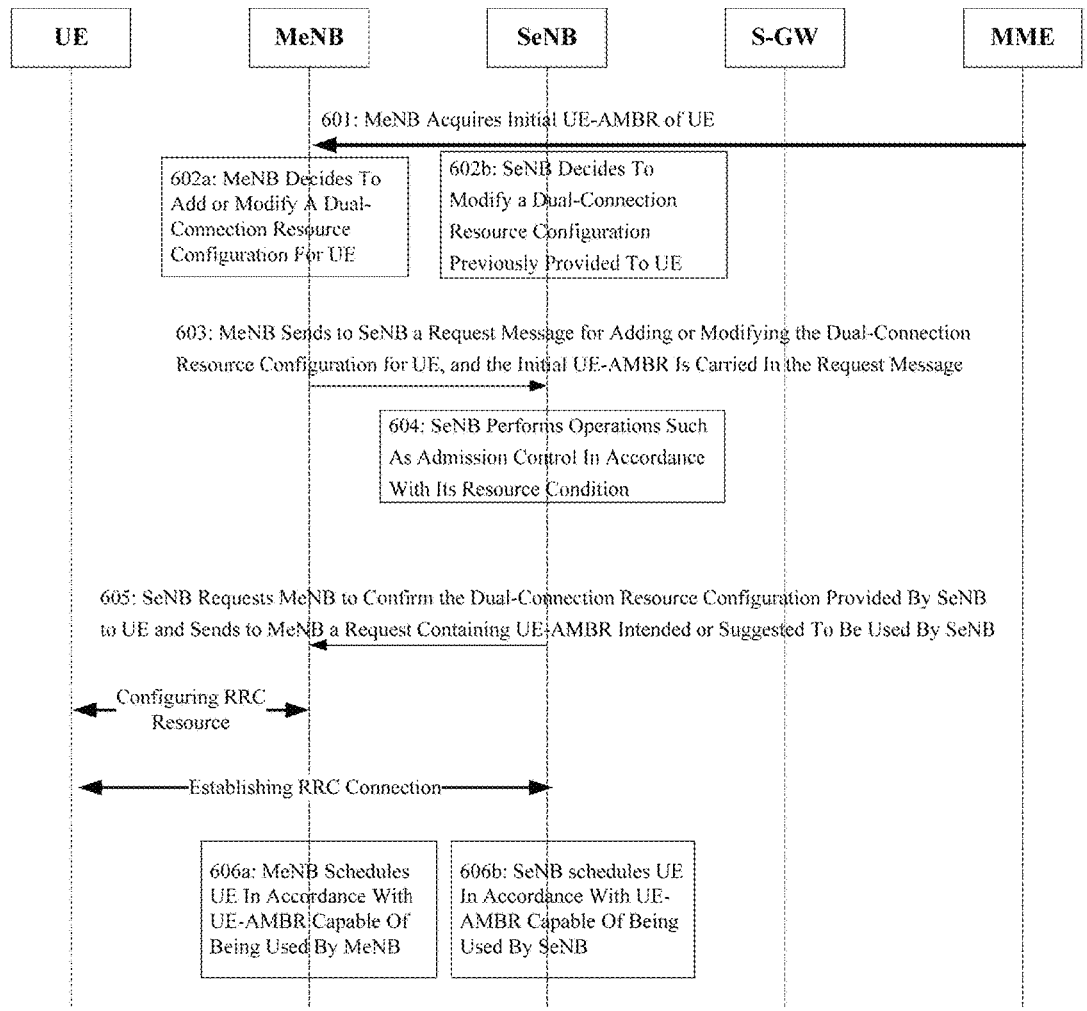
FIG. 6 is another flow chart of the QoS Management method according to the third embodiment of the present disclosure.

In the QoS management method in FIG. 6, the network control entity is an MeNB, and the QoS parameter is a UE-AMBR. UE-AMBR thresholds corresponding to the UE-AMBR and capable of being used by the MeNB and the SeNB may be determined as follows.

After the MeNB acquires from the MME the initial UE-AMBR of the UE, it notifies the SeNB of the initial UE-AMBR of the UE, and the SeNB sends to the MeNB a request containing a UE-AMBR suggested to be used by the SeNB (e.g., SeNB preferred UE-AMBR). In the case that the MeNB has accepted the request, the UE-AMBR capable of being used by the MeNB is a difference between the initial UE-AMBR of the UE and the SeNB preferred UE-AMBR, or a value smaller than this difference. In addition, the MeNB and the SeNB may also negotiate with each other to modify the UE-AMBR currently used by the SeNB at any time. However, at any time point, the sum of the UE-AMBR currently used by the MeNB and the UE-AMBR currently used by the SeNB shall not be greater than the initial UE-AMBR acquired from the MME.

To be specific, as shown in FIG. 6, the QoS management method may include the following steps.

Step 601: the MeNB acquires the initial UE-AMBR of the UE. To be specific, the MeNB may initiate an initial UE context setup request to the MME and receive an initial UE context response message from the MME, so as to acquire the initial UE-AMBR of the UE from the MME.

Step 602a: the MeNB decides to add or modify a dual-connectivity resource configuration for the UE (RRM Decision to add/modify SeNB resources), or Step 602b: the SeNB decides to modify a dual-connectivity resource configuration previously provided to the UE (RRM Decision to modify SeNB resources).

Step 603: in the case that the MeNB sends to the SeNB a request message for adding or modifying the dual-connectivity resource configuration for the UE (SeNB Addition/Modification Request), the MeNB notifies the SeNB of a service bearer for the resources desired to be provided by the SeNB and notifies the SeNB of the initial UE-AMBR of the UE.

It should be appreciated that, in this embodiment, in the case that the MeNB requests the SeNB to add or modify the dual-connectivity resource configuration for UE, the MeNB may send the request message in the form of, but not limited to, SeNB Addition/Modification Request.

Step 604: the SeNB performs operations such as admission control in accordance with its resource condition.

Step 605: the SeNB requests the MeNB to confirm the dual-connectivity resource configuration provided by the SeNB to the UE (SeNB Addition/Modification Command) and sends to the MeNB a request containing the UE-AMBR intended or suggested to be used by the SeNB, e.g., SeNB preferred UE-AMBR, and then the RRC connection with the UE may be configured for the MeNB (RRC Reconfig), so as to establish the RRC connections between the MeNB and the UE, and between the SeNB and the UE.

Step 606: the MeNB accepts the request containing the UE-AMBR intended or suggested to be used by the SeNB, and at this time, the UE-AMBR capable of being used by the MeNB is a difference between the initial UE-AMBR of the UE and the SeNB preferred UE-AMBR, or a value smaller than this difference. In addition, the MeNB and the SeNB may negotiate with each other in a similar way so as to modify the UE-AMBR currently used by the SeNB. However, a sum of the UE-AMBR currently used by the MeNB and the UE-AMBR currently used by the SeNB shall not be greater than the initial UE-AMBR of the UE.

To be specific, Step 606 may include the following steps.

Step 606a: the MeNB schedules the UE in accordance with the UE-AMBR capable of being used by the MeNB. At this time, the UE-AMBR capable of being used by the MeNB shall not be greater than a value obtained by subtracting the SeNB preferred UE-AMBR from the initial UE-AMBR of the UE.

Step 606b: the SeNB schedules the UE in accordance with the UE-AMBR capable of being used by the SeNB. At this time, the UE-AMBR capable of being used by the SeNB shall not be greater than the SeNB preferred UE-AMBR.

QoS Management Method of a Third Type

Figure 7:
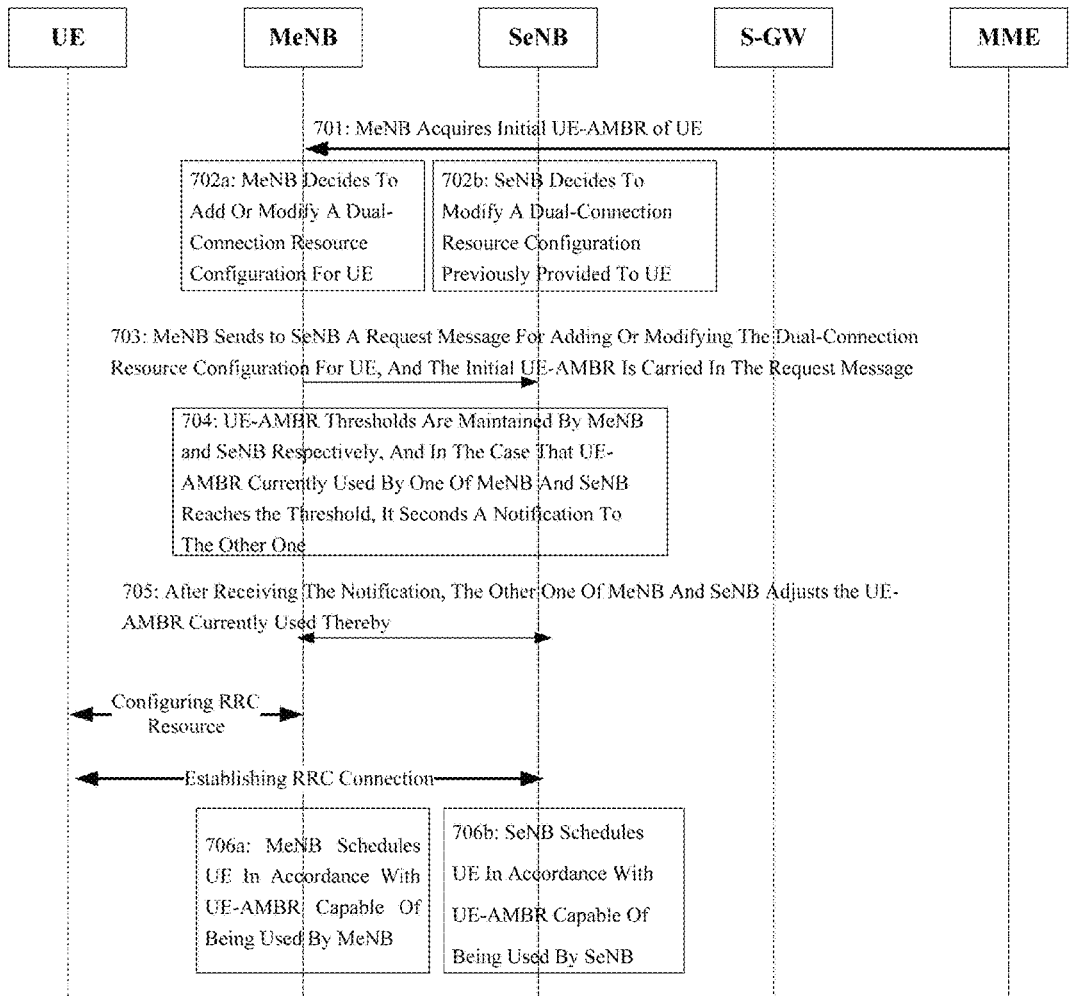
FIG. 7 is yet another flow chart of the QoS Management method according to the third embodiment of the present disclosure.

In the QoS management method in FIG. 7, the network control entity is an MeNB, and the QoS parameter is a UE-AMBR. UE-AMBR thresholds corresponding to the UE-AMBR and capable of being used by the MeNB and the SeNB may be determined as follows.

The MeNB acquires from the MME the initial UE-AMBR of the UE, and notifies the SeNB of the initial UE-AMBR. The MeNB and the SeNB provide services to the UE in accordance with the UE-AMBR thresholds maintained thereby. To be specific, in the case that the UE-AMBR currently used by each of the MeNB and the SeNB is smaller than the corresponding UE-AMBR threshold (e.g., smaller than 50% of the initial UE-AMBR), the MeNB and the SeNB may continue to provide the services to the UE independently. In the case that the UE-AMBR currently used by one of the MeNB and the SeNB (e.g., the MeNB) reaches the corresponding UE-AMBR threshold (e.g., 50% of the initial UE-AMBR), the one of the MeNB and the SeNB may notify the other one to adjust its QoS parameter value. Each of the MeNB and the SeNB may be provided with different UE-AMBR thresholds at a certain step size.

In other words, in the QoS management method in FIG. 7, in the case that the MeNB and the SeNB, with respect to any one of the QoS parameters, provide the services to the UE in accordance with the initial QoS parameter thresholds corresponding to the QoS parameter and capable of being used by the MeNB and the SeNB, the QoS parameter values or QoS parameter thresholds corresponding to the MeNB and the SeNB may be dynamically adjusted in accordance with the practical need, so as to provide the appropriate QoS parameter thresholds.

To be specific, as shown in FIG. 7, the QoS management method may include the following steps.

Step 701: the MeNB acquires the initial UE-AMBR of the UE. To be specific, the MeNB may initiate an initial UE context setup request to the MME and receive an initial UE context response message from the MME, so as to acquire the initial UE-AMBR of the UE from the MME.

Step 702*a*: the MeNB decides to add or modify a dual-connectivity resource configuration for the UE (RRM Decision to add/modify SeNB resources), or Step 702*b*: the SeNB decides to modify a dual-connectivity resource configuration previously provided to the UE (RRM Decision to modify SeNB resources).

Step 703: in the case that the MeNB sends to the SeNB a request message for adding or modifying the dual-connectivity resource configuration for the UE (SeNB Addition/Modification Request), the MeNB notifies the SeNB of the initial UE-AMBR of the UE.

It should be appreciated that, in this embodiment, in the case that the MeNB requests the SeNB to add or modify the dual-connectivity resource configuration for UE, the MeNB may send the request message in the form of, but not limited to, SeNB Addition/Modification Request.

Step 704: the UE-AMBR thresholds are maintained by the MeNB and the SeNB respectively. In the case that the UE-AMBR used by one of the MeNB and the SeNB (e.g., the MeNB) reaches a UE-AMBR threshold (which may be an absolute value, e.g., a certain UE-AMBR value, or a relative value, e.g., 50% of the initial UE-AMBR), it may send a notification to the other one (e.g., the SeNB). It should be appreciated that, the UE-AMBR thresholds maintained by the MeNB and the SeNB may be identical to, or different from, each other, and a sum of the two UE-AMBR thresholds shall not be greater than the initial UE-AMBR of the UE.

Step 705: after the other one of the MeNB and the SeNB (e.g., the SeNB) has received the notification, it may adjust the UE-AMBR currently used thereby. At this time, the SeNB may reduce an amplitude and a granular level of the UE-AMBR, for example, reduce a step size of the UE-AMBR (e.g., reduce the UE-AMBR threshold by 10% of the initial UE-AMBR or by a certain absolute value). In addition, the MeNB may also instruct the SeNB to reduce or modify the step size or amplitude of the UE-AMBR currently used by the SeNB.

In addition, the MeNB and the SeNB may negotiate with each other in a similar manner so as to modify the UE-AMBR currently used by the SeNB, but the sum of the UE-AMBRs currently used by the MeNB and the SeNB shall not be greater than the initial UE-AMBR of the UE.

Step 706: the MeNB and the SeNB provide the services to the UE in accordance with the UE-AMBRs currently used by them.

To be specific, Step 706 may include the following steps.

Step 706*a*: the MeNB schedules the UE in accordance with the UE-AMBR capable of being used by the MeNB. Once the UE-AMBR currently used by the MeNB reaches a threshold, it may continue to send a notification to the SeNB.

Step 706*b*: the SeNB schedules the UE in accordance with the UE-AMBR capable of being used by the SeNB. Once the UE-AMBR currently used by the SeNB reaches a threshold, it may continue to send a notification to the MeNB.

QoS Management Method of a Fourth Type

Figure 8:
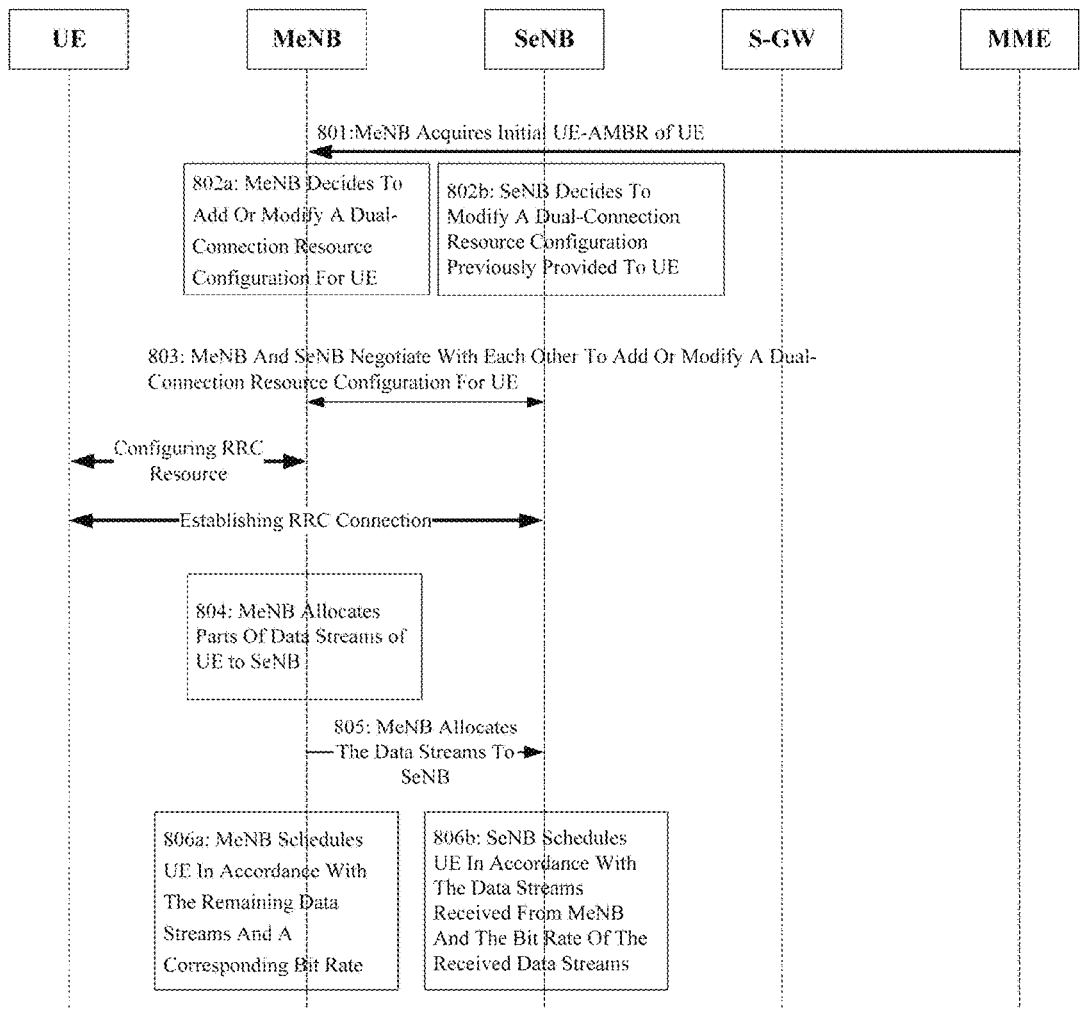
FIG. 8 is still yet another flow chart of the QoS Management method according to the third embodiment of the present disclosure.

In the QoS management method in FIG. 8, the network control entity is an MeNB, and the QoS parameter is a UE-AMBR. The principle involved in the QoS management method will be described as follows. In the case that data streams distributed by the SeNB to the UE are allocated by the MeNB, the QoS control over the UE is performed by the MeNB. Correspondingly, the SeNB and the MeNB may provide services to the UE in accordance with the data streams from the MeNB.

In other words, with respect to any one of the QoS parameters representing a data transmission characteristic in a downlink direction, in the case that the data streams distributed by the MeNB and the SeNB to the terminal are allocated by the MeNB, the QoS parameter thresholds corresponding to the QoS parameter and capable of being used by the MeNB and the SeNB may be determined in accordance with the data streams received by the MeNB and the SeNB from the MeNB and bit rates of the received data streams.

To be specific, as shown in FIG. 8, the QoS management method may include the following steps.

Step 801: the MeNB acquires the initial UE-AMBR of the UE. To be specific, the MeNB may initiate an initial UE context setup request to the MME and receive an initial UE context response message from the MME, so as to acquire the initial UE-AMBR of the UE from the MME.

Step 802*a*: the MeNB decides to add or modify a dual-connectivity resource configuration for the UE (RRM Decision to add/modify SeNB resources), or Step 802*b*: the SeNB decides to modify a dual-connectivity resource configuration previously provided to the UE (RRM Decision to modify SeNB resources).

Step 803: the MeNB and the SeNB negotiate with each other to add or modify a dual-connectivity resource configuration for the UE, and then a RRC connection with the UE may be configured for the MeNB (RRC Reconfig), so as to establish the RRC connections between the MeNB and the UE, and between the SeNB and the UE.

Step 804: the MeNB allocates parts of the data streams to the SeNB in accordance with a predetermined UE-AMBR threshold. For example, the MeNB may allocate the data streams to the SeNB in accordance with the initial UE-AMBR of the UE, so as to reduce the bit rate of the data streams allocated to the SeNB. In this way, a bit rate of the data streams transmitted from the SeNB to the UE may not be greater than the initial UE-AMBR.

Step 805: the allocated data streams are transmitted to the SeNB at a certain bit rate under the control of the MeNB.

Step 806a: the MeNB schedules the UE in accordance with the remaining data streams and a corresponding bit rate.

Step 806b: the SeNB schedules the UE in accordance with the data streams received from the MeNB and the bit rate of the received data streams. The bit rate of the data streams transmitted from the MeNB to the UE has been taken into consideration in the case that the data streams are allocated by the MeNB to the SeNB, so the bit rate of the data streams transmitted from the SeNB to the UE may not be greater than the initial UE-AMBR.

QoS Management Method of a Fifth Type

Figure 9:
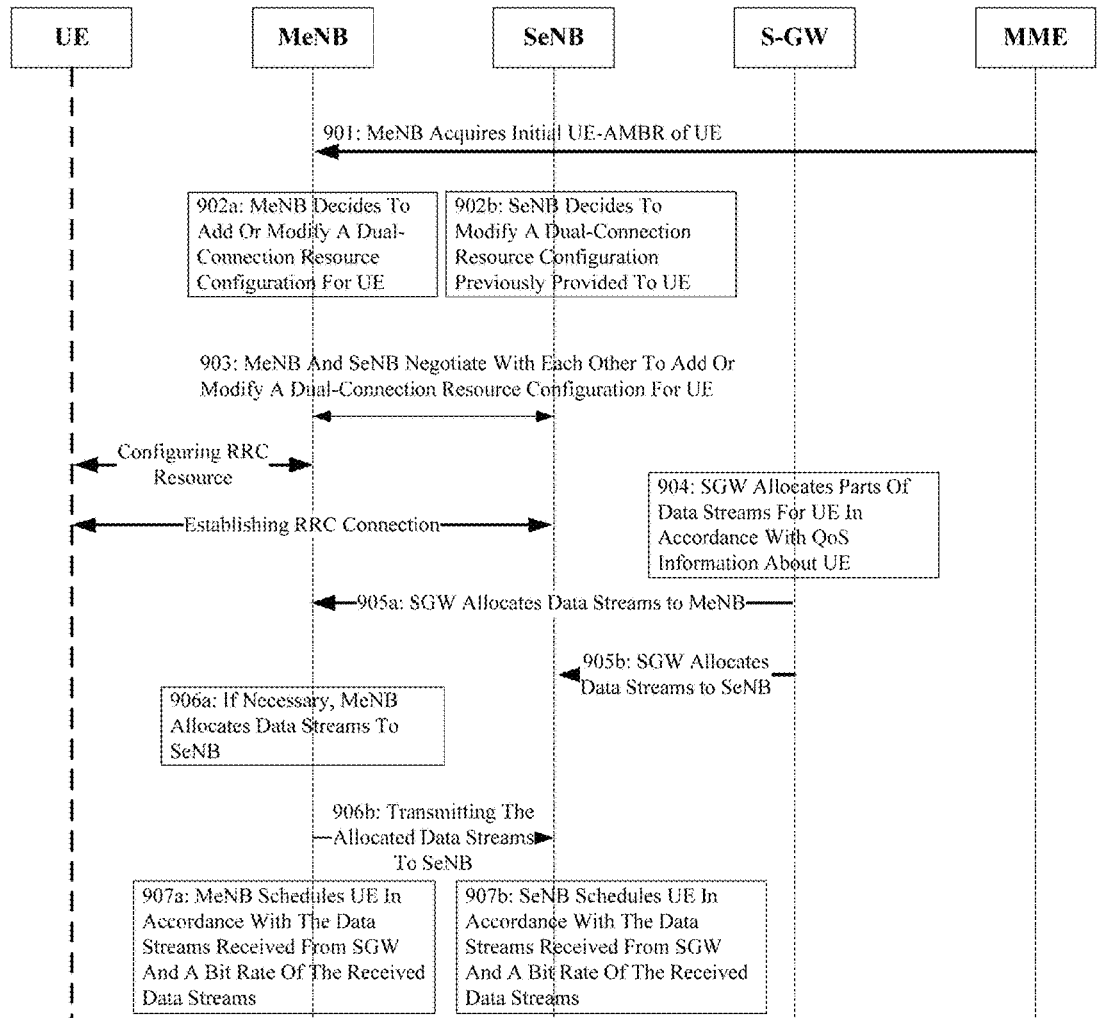
FIG. 9 is still yet another flow chart of the QoS Management method according to the third embodiment of the present disclosure.

In the QoS management method in FIG. 9, the network control entity is an SGW, and the QoS parameter is a UE-AMBR. The principle involved in the QoS management method will be described as follows. In the case that data streams distributed by the MeNB and the SeNB to the UE are allocated by a core network node (e.g., the SGW), the QoS control over the UE is performed by the SGW. Correspondingly, the SeNB and the MeNB may provide services to the UE in accordance with the data streams from the core network node (e.g., the SGW).

In other words, with respect to any one of the QoS parameters representing a data transmission characteristic in a downlink direction, in the case that the data streams distributed by the MeNB and the SeNB to the terminal are allocated by the SGW, the QoS parameter thresholds corresponding to the QoS parameter and capable of being used by the MeNB and the SeNB may be determined in accordance with the data streams received by the MeNB and the SeNB from the SGW and bit rates of the received data streams.

To be specific, as shown in FIG. 9, the QoS management method may include the following steps.

Step 901: the MeNB acquires the initial UE-AMBR of the UE. To be specific, the MeNB may initiate an initial UE context setup request to the MME and receive an initial UE context response message from the MME, so as to acquire the initial UE-AMBR of the UE from the MME.

Step 902a: the MeNB decides to add or modify a dual-connectivity resource configuration for the UE (RRM Decision to add/modify SeNB resources), or Step 902b: the SeNB decides to modify a dual-connectivity resource configuration previously provided to the UE (RRM Decision to modify SeNB resources).

Step 903: the MeNB and the SeNB negotiate with each other to add or modify a dual-connectivity resource configuration for the UE, and then a RRC connection with the UE may be configured for the MeNB (RRC Reconfig), so as to establish the RRC connections between the MeNB and the UE, and between the SeNB and the UE.

Step 904: in the case that the data streams are allocated by the SGW for the UE, the SGW allocates parts of the data streams to the MeNB and allocates the remaining data streams to the SeNB in accordance with QoS information about the UE, e.g., the UE-AMBR threshold. For example, the SGW may allocate the data streams to the MeNB and the SeNB in accordance with the initial UE-AMBR of the UE, so as to reduce bit rates of the data streams allocated to the MeNB and the SeNB. In this way, the bit rates of the data streams transmitted from the MeNB and the SeNB to the UE may not be greater than the initial UE-AMBR.

Step 905a: the allocated data streams are transmitted at a certain bit rate to the MeNB under the control of the SGW.

Step 905b: the remaining allocated data streams are transmitted at a certain bit rate to the SeNB under the control of the SGW.

Step 906a: if necessary, the MeNB may decide to allocate parts of the data streams to the SeNB.

Step 906b: the parts of the data streams are transmitted at a certain bit rate to the SeNB under the control of the MeNB.

Step 907a: the MeNB schedules the UE in accordance with the data streams received from the SGW and the bit rate of the received data streams. The bit rate of the data streams transmitted from the MeNB to the UE has been taken into consideration in the case that the data streams are allocated by the SGW to the MeNB, and the bit rate of the data streams transmitted from the SeNB to the UE has also been taken into consideration in the case that the data streams are allocated by the MeNB to the SeNB, so the bit rate of the data streams transmitted from the MeNB to the UE may not be greater than the initial UE-AMBR.

Step 907b: the SeNB schedules the UE in accordance with the data streams received from the SGW and the bit rate of the received data streams. The bit rate of the data streams transmitted from the SeNB to the UE has been taken into consideration in the case that the data streams are allocated by the SGW to the SeNB, so the bit rate of the data streams transmitted from the SeNB to the UE may not be greater than the initial UE-AMBR either. Even if the SeNB has received the data streams from the MeNB, the bit rate of the data streams transmitted from the SeNB to the UE may not be greater than the initial UE-AMBR because the bit rate of the data streams transmitted from the SeNB to the UE has also been taken into consideration in the case that the data streams are allocated by the MeNB to the SeNB.

According to the QoS management method in the third embodiment of the present disclosure, with respect to the terminal in the dual-connectivity scenario, the QoS parameter thresholds corresponding to the QoS parameters may be re-allocated to the MeNB and the SeNB for the terminal in accordance with the acquired initial values corresponding to the QoS parameters of the terminal, so as to ensure that the QoS parameter values finally acquired by the terminal and corresponding to the QoS parameters do not exceed the numerical range defined by the initial values of the QoS parameters. As a result, it is able to match the service provided to the terminal with the QoS that should have been possessed thereby in the case that the terminal is served by the MeNB and the SeNB, thereby to control the QoS of the terminal and improve the service flow transmission quality of the terminal as well as the business performance.

Fourth Embodiment

The present disclosure provides in this embodiment a network control entity for implementing the method in the first embodiment. The network control entity may be an independent device, e.g., an MeNB or an SGW of a core network that provides services to a terminal, or a device integrated into the independent device.

Figure 10:
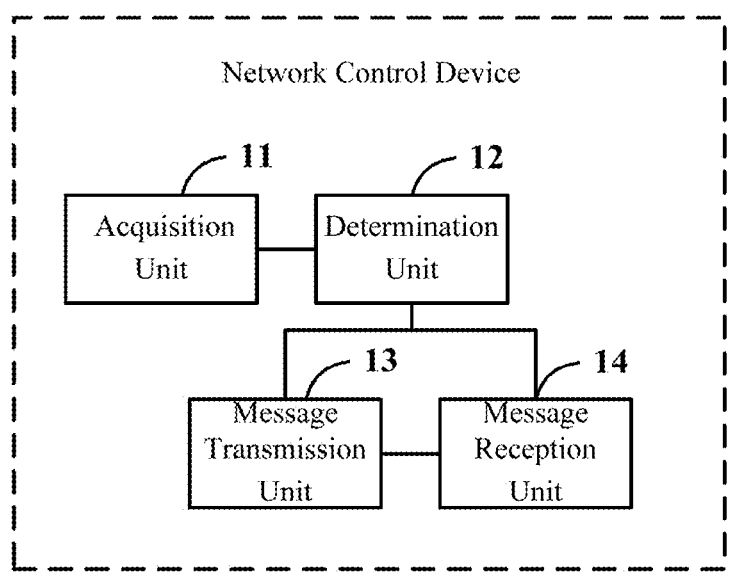
FIG. 10 is a schematic view showing a network control entity according to the fourth embodiment of the present disclosure.

To be specific, as shown in FIG. 10, the network control entity may include an acquisition unit 11 and a determination unit 12.

The acquisition unit 11 may be configured to, with respect to a terminal in a dual-connectivity scenario, acquire initial values corresponding to QoS parameters of the terminal. In this embodiment, the acquisition unit 11 may be configured to acquire the initial values corresponding to the QoS parameters of the terminal from a network entity (e.g., an MME) for storing terminal subscription data and types of services. Generally, the QoS parameters may include one or more of UE-AMBR, MBR and GBR.

The determination unit 12 may be configured to, with respect to any one of the QoS parameters, determine, in accordance with the initial value corresponding to the QoS parameter acquired by the acquisition unit 11, QoS parameter thresholds corresponding to the QoS parameter and capable of being used by an MeNB and an SeNB which provide services to the terminal, so that the MeNB and the SeNB use respective QoS parameter values within respective numerical ranges defined by the respective QoS parameter thresholds corresponding to the QoS parameter to provide corresponding services to the terminal. A sum of the determined QoS parameter thresholds corresponding to the QoS parameter and capable of being used by the MeNB and the SeNB does not exceed a numerical range defined by the initial value corresponding to the QoS parameter.

It should be appreciated that, that the sum of the determined QoS parameter thresholds corresponding to the QoS parameter and capable of being used by the MeNB and the SeNB does not exceed the numerical range defined by the initial value corresponding to the QoS parameter generally refers to that, the sum of the determined QoS parameter thresholds corresponding to the QoS parameter and capable of being used by the MeNB and the SeNB is located within the numerical range defined by the initial values corresponding to the QoS parameter.

For example, the QoS parameter such as UE-AMBR or MBR is used to define an upper limit of a bit rate capable of being used by the terminal, and the QoS parameter thresholds corresponding to the QoS parameter and capable of being used by the MeNB and the SeNB are just the corresponding upper limits. At this time, that the sum of the determined QoS parameter thresholds corresponding to the QoS parameter and capable of being used by the MeNB and the SeNB does not exceed the numerical range defined by the initial value corresponding to the QoS parameter generally refers to that, the sum of the determined QoS parameter thresholds corresponding to the QoS parameter and capable of being used by the MeNB and the SeNB is located within the numerical range defined by the initial value corresponding to the QoS parameter, i.e., not greater than the initial value corresponding to the QoS parameter.

For another example, the QoS parameter such as GBR is used to define a lower limit of a bit rate capable of being used by the terminal, and the QoS parameter thresholds corresponding to the QoS parameter and capable of being used by the MeNB and the SeNB are just the corresponding lower limits. At this time, that the sum of the determined QoS parameter thresholds corresponding to the QoS parameter and capable of being used by the MeNB and the SeNB does not exceed the numerical range defined by the initial value corresponding to the QoS parameter generally refers to that, the sum of the determined QoS parameter thresholds corresponding to the QoS parameter and capable of being used by the MeNB and the SeNB is located within the numerical range defined by the initial value corresponding to the QoS parameter, i.e., not smaller than the initial value corresponding to the QoS parameter.

To be specific, the determination unit 12 may be further configured to, with respect any one of the QoS parameters, designate for the MeNB and the SeNB the QoS parameter thresholds corresponding to the QoS parameter and capable of being used by the MeNB and the SeNB in accordance with the initial value corresponding to the QoS parameter.

Alternatively, the determination unit 12 may be further configured to, with respect to any one of the QoS parameters, designate the QoS parameter threshold corresponding to the QoS parameter and capable of being used by one of the MeNB and the SeNB in accordance with the initial value corresponding to the QoS parameter, and determine the QoS parameter threshold corresponding to the QoS parameter and capable of being used by the other one of the MeNB and the SeNB in accordance with the designated QoS parameter threshold to be used by the one of the MeNB and the SeNB as well as the initial value corresponding to the QoS parameter. For example, in the case that the network control entity is the MeNB, with respect to any one of the QoS parameters, the determination unit 12 may be configured to designate the QoS parameter threshold corresponding to the QoS parameter capable of the used by the SeNB in accordance with the initial value corresponding to the QoS parameter, and determine the QoS parameter threshold corresponding to the QoS parameter and capable of being used by the MeNB in accordance with the designated QoS parameter threshold and the initial value corresponding to the QoS parameter. For example, in the case that the QoS parameter is UE-AMBR or MBR, a difference between the initial value corresponding to the QoS parameter and the QoS parameter threshold corresponding to the QoS parameter and designated to the SeNB, or a QoS parameter value smaller than this difference, is taken as the QoS parameter threshold corresponding to the QoS parameter and capable of being used by the MeNB.

Alternatively, the determination unit 12 may be configured to, with respect to any one of the QoS parameters, receive from the MeNB and the SeNB the QoS parameter thresholds corresponding to the QoS parameter and capable of being used by the MeNB and the SeNB, and use the received QoS parameter thresholds as the QoS parameter thresholds corresponding to the QoS parameter and capable of being used by the MeNB and the SeNB.

Alternatively, the determination unit 12 may be configured to, with respect to any one of the QoS parameters, receive from one of the MeNB and the SeNB the QoS parameter threshold corresponding to the QoS parameter and capable of being used by the one of the MeNB and the SeNB, and determine the QoS threshold corresponding to the QoS parameter and capable of being used by the other one of the MeNB and the SeNB in accordance with the received QoS parameter threshold and the initial value corresponding to the QoS parameter. For example, in the case that the network control entity is the MeNB, with respect to any one of the QoS parameters, the determination unit 12 may be configured to receive from the SeNB the QoS parameter threshold corresponding to the QoS parameter and capable of being used by the SeNB, and determine the QoS parameter threshold corresponding to the QoS parameter and capable of being used by the MeNB in accordance with the received QoS parameter threshold and the initial value corresponding to the QoS parameter. For example, in the case that the QoS parameter is UE-AMBR or MBR, a difference between the initial value corresponding to the QoS parameter and the QoS parameter threshold corresponding to the QoS parameter and capable of being used by the SeNB, or a QoS parameter value smaller than this difference, is used as the QoS parameter threshold corresponding to the QoS parameter and capable of being used by the MeNB.

Alternatively, the network control entity may further include a message transmission unit 13 and/or a message reception unit 14.

The message transmission unit 13 may be configured to, with respect to any one of the QoS parameters, in the case that the QoS parameter value corresponding to the QoS parameter and currently used by one of the MeNB and the SeNB exceeds a numerical range defined by the QoS parameter threshold corresponding to the QoS parameter and capable of being used by the one of the MeNB and the SeNB, send a first notification message to the other one of the MeNB and the SeNB, so as to instruct the other one of the MeNB and the SeNB to, in accordance with the first notification message, adjust the QoS parameter value corresponding to the QoS parameter and currently used by the other one of the MeNB and the SeNB in such a manner that a sum of the adjusted QoS parameter values corresponding to the QoS parameter and currently used by the MeNB and the SeNB does not exceed the numerical range defined by the initial value corresponding to the QoS parameter.

For example, in the case that the network control entity is the MeNB, with respect to any one of the QoS parameter, the message transmission unit 13 may be configured to, in the case that the QoS parameter value corresponding to the QoS parameter and currently used by the MeNB exceeds the numerical range defined by the QoS parameter threshold corresponding to the QoS parameter and capable of being used by the MeNB, send the first notification message to the SeNB, so as to instruct the SeNB to, in accordance with the first notification message, adjust the QoS parameter value corresponding to the QoS parameter and currently used by the SeNB in such a manner that the sum of the adjusted QoS parameter values corresponding to the QoS parameter and currently used by the MeNB and the SeNB does not exceed the numerical range defined by the initial value corresponding to the QoS parameter.

It should be appreciated that, after the other one of the MeNB and the SeNB is instructed to adjust the QoS parameter value corresponding to the QoS parameter and currently used by the other one of the MeNB and the SeNB in accordance with the first notification message, the QoS parameter thresholds corresponding to the QoS parameter and capable of being used by the MeNB and the SeNB may be re-adjusted in accordance with the QoS parameter values corresponding to the QoS parameter and currently used by the MeNB and the SeNB.

The message reception unit 14 may be configured to receive a second notification message from one of the MeNB and the SeNB, so as to instruct, in accordance with the second notification message, the other one of the MeNB and the SeNB to adjust the QoS parameter value corresponding to the QoS parameter and currently used by the other one of the MeNB and the SeNB in such a manner that the sum of the QoS parameter values corresponding to the QoS parameter and currently used by the MeNB and the SeNB does not exceed the numerical range defined by the initial value corresponding to the QoS parameter. The second notification message is transmitted by one of the MeNB and the SeNB to the network control entity in the case that the one of the MeNB and the SeNB determines that the QoS parameter value corresponding to the QoS parameter and currently used thereby exceeds the numerical range defined by the QoS parameter threshold corresponding to the QoS parameter and capable of being used by the one of the MeNB and the SeNB.

For example, in the case that the network control entity is the MeNB, the message reception unit 14 may be configured to receive the second notification message from the SeNB, so as to adjust, in accordance with the second notification message, the QoS parameter value corresponding to the QoS parameter and currently used by the MeNB in such a manner that the sum of the QoS parameter values corresponding to the QoS parameter and currently used by the MeNB and the SeNB does not exceed the numerical range defined by the initial value corresponding to the QoS parameter. At this time, the second notification message may sent by the SeNB to the MeNB in the case that the SeNB determines that the QoS parameter value corresponding to the QoS parameter and currently used by the SeNB exceeds the numerical range defined by the QoS parameter threshold corresponding to the QoS parameter and capable of being used by the SeNB.

Similarly, after the other one of the MeNB and the SeNB is instructed to adjust the QoS parameter value corresponding to the QoS parameter and currently used by the other one of the MeNB and the SeNB in accordance with the second notification message, the QoS parameter thresholds corresponding to the QoS parameter and capable of being used by the MeNB and the SeNB may be re-adjusted in accordance with the QoS parameter values corresponding to the QoS parameter and currently used by the MeNB and the SeNB.

Further, the first notification message may carry a QoS parameter-value adjustment amount or adjustment step size. At this time, the message transmission unit 13 may be configured to send to the other one of the MeNB and the SeNB the first notification message, so as to instruct it to adjust the QoS parameter value corresponding to the QoS parameter and currently used by the other one of the MeNB and the SeNB in accordance with the QoS parameter-value adjustment amount or adjustment step size carried in the first notification message.

Similarly, the second notification message may also carry the QoS parameter-value adjustment amount or adjustment step size. At this time, the message reception unit 14 may be configured to receive the second notification message from one of the MeNB and the SeNB, so as to instruct the other one of the MeNB and the SeNB to adjust the QoS parameter value corresponding to the QoS parameter and currently used by the other one of the MeNB and the SeNB in accordance with the QoS parameter-value adjustment amount or adjustment step size carried in the second notification message.

Further, in the fourth embodiment of the present disclosure, with respect to any one of the QoS parameter representing a data transmission characteristic in a downlink direction, the determination unit 12 may further be configured to, in the case that data streams distributed by the MeNB and the SeNB to the terminal are allocated by the MeNB, determine the QoS parameter thresholds corresponding to the QoS parameter and capable of being used by the MeNB and the SeNB in accordance with the data streams received by the MeNB and the SeNB from the MeNB and bit rates of the received data streams.

Alternatively, the determination unit 12 may be further configured to, in the case that the data streams distributed by the MeNB and the SeNB to the terminal are allocated by an SGW, determine the QoS parameter thresholds corresponding to the QoS parameter and capable of being used by the MeNB and the SeNB in accordance with the data streams received by the MeNB and the SeNB from the SGW and bit rates of the received data streams.

Alternatively, the determination unit 12 may be further configured to, in the case that the data streams distributed by the MeNB and the SeNB to the terminal are allocated by the MeNB and the SGW, determine the QoS parameter threshold corresponding to the QoS parameter and capable of being used by the SeNB in accordance with the overall data streams received by the SeNB from the SGW and the MeNB and an overall bit rate of the received data streams, and determine the QoS parameter threshold corresponding to the QoS parameter and capable of being used by the MeNB in accordance with the data streams received by the MeNB from the SGW, a bit rate of the received data streams, the data streams allocated by the MeNB to the SeNB and a bit rate of the allocated data streams.

According to the network control entity in the fourth embodiment of the present disclosure, with respect to the terminal in the dual-connectivity scenario, the QoS parameter thresholds corresponding to the QoS parameters may be re-allocated to the MeNB and the SeNB for the terminal in accordance with the acquired initial values corresponding to the QoS parameters of the terminal, so as to ensure that the QoS parameter values finally acquired by the terminal and corresponding to the QoS parameters do not exceed the numerical range defined by the initial values of the QoS parameters. As a result, it is able to match the service provided to the terminal with the QoS that should have been possessed thereby in the case that the terminal is served by the MeNB and the SeNB, thereby to control the QoS of the terminal and improve the service flow transmission quality of the terminal as well as the business performance.

Fifth Embodiment

The present disclosure further provides in this embodiment a base station for implementing the method in the second embodiment. It should be appreciated that, in the case that the network control entity is a third-party device such as an SGW, the base station in this embodiment may be an MeNB or SeNB that provides services to a terminal, and in the case that the network control entity is the MeNB, the base station in this embodiment usually refers to the SeNB.

Figure 11:
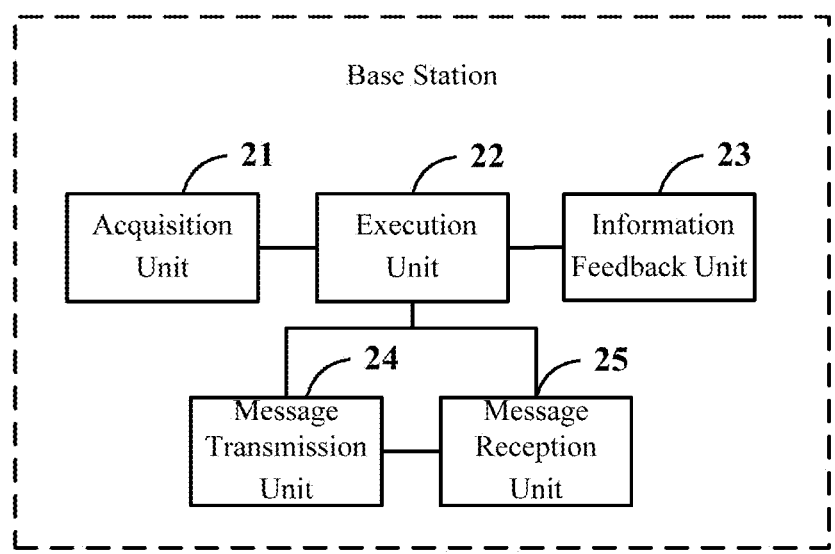
FIG. 11 is a schematic view showing a base station according to the fifth embodiment of the present disclosure.

To be specific, as shown in FIG. 11, the base station may include an acquisition unit 21 and an execution unit 22.

The acquisition unit 21 may be configured to, with respect to a terminal in a dual-connectivity scenario, acquire QoS parameter thresholds corresponding to QoS parameters of the terminal, capable of being used by the base station and determined by the network control entity for the base station. The QoS parameters may include one or more of UE-AMBR, MBR and GBR.

It should be appreciated that, in the case that the network control entity is a third-party device such as an SGW, the base station may exchange the relevant information (e.g., information about the QoS parameter) with the network control entity via an S1 interface. In the case that the network control entity is the MeNB or a device integrated into the MeNB, the base station may exchange the information with the network control entity via an X2 interface between the MeNB and the SeNB or a third-party device such as an SGW (at this time, the S1 interface may be used).

The execution unit 22 may be configured to, with respect to any one of the QoS parameter, provide, in accordance with the QoS parameter threshold corresponding to the QoS parameter, capable of being used by the base station and determined by the network control entity for the base station, a corresponding service to the terminal using a QoS parameter value within a numerical range defined by the QoS parameter threshold corresponding to the QoS parameter and capable of being used by the base station.

A sum of the QoS parameter threshold corresponding to the QoS parameter, capable of being used by the base station and determined by the network control entity for the base station, and a QoS parameter threshold corresponding to the QoS parameter, capable of being used by a further base station which cooperates with the base substation to provide a service to the terminal, and determined by the network control entity for the further base station, does not exceed a numerical range defined by an initial value corresponding to the QoS parameter of the terminal acquired by the network control entity.

Alternatively, the base station in this embodiment may further include a information feedback unit 23 configured to, with respect to any one of the QoS parameters and prior to acquiring the QoS parameter threshold corresponding to the QoS parameter, capable of being used by the base station and determined by the network control entity for the base station, return to the network control entity the QoS parameter threshold corresponding to the QoS parameter and capable of being used by the base station, so that the network control entity determines for the base station the QoS parameter threshold corresponding to the QoS parameter and capable of being used by the base station in accordance with the returned QoS parameter threshold.

Alternatively, the base station in this embodiment may further include a message reception unit 24 and/or a message transmission unit 25.

The message reception unit 24 may be configured to receive a first notification message from the network control entity, and adjust, in accordance with the first notification message, the QoS parameter value corresponding to the QoS parameter and currently used by the base station in such a manner that a sum of the adjusted QoS parameter values corresponding to the QoS parameter and currently used by the base station and the further base station does not exceed the numerical range defined by the initial value corresponding to the QoS parameter. The first notification message is transmitted by the network control entity to the base station in the case that the network control entity determines that the QoS parameter value corresponding to the QoS parameter and currently used by the further base station exceeds a numerical range defined by the QoS parameter value corresponding to the QoS parameter and capable of being used by the further base station.

The message transmission unit 25 may be configured to, with respect to any one of the QoS parameters, in the case that the QoS parameter value corresponding to the QoS parameter and currently used by the base station exceeds the numerical range defined by the QoS parameter threshold corresponding to the QoS parameter and capable of being used by the base station, send a second notification message to the network control entity, so as to instruct the further base station by the network control entity, in accordance with the second notification message, to adjust the QoS parameter value corresponding to the QoS parameter and currently used by the further base station in such a manner that a sum of the adjusted QoS parameter values corresponding to the QoS parameter and currently used by the base station and the further base station does not exceed the numerical range defined by the initial value corresponding to the QoS parameter.

Generally, the first notification message may carry a QoS parameter-value adjustment amount or adjustment step size. At this time, the message reception unit 24 may be further configured to receive the first notification message from the network control entity, and adjust the QoS parameter value corresponding to the QoS parameter and currently used by the base station in accordance with the QoS parameter-value adjustment amount or adjustment step size carried in the first notification message.

Correspondingly, the second notification message may also carry the QoS parameter-value adjustment amount or adjustment step size. At this time, the message transmission unit 25 may be further configured to send the second notification message to the network control entity, so as to instruct the further base station by the network control entity to adjust the QoS parameter value corresponding to the QoS parameter and currently used by the further base station in accordance with the QoS parameter-value adjustment amount or adjustment step size carried in the second notification message.

According to the base station in the fifth embodiment of the present disclosure, with respect to the terminal in the dual-connectivity scenario, the QoS parameter thresholds corresponding to the QoS parameters may be re-allocated to the MeNB and the SeNB for the terminal in accordance with the acquired initial values corresponding to the QoS parameters of the terminal, so as to ensure that the QoS parameter values finally acquired by the terminal and corresponding to the QoS parameters do not exceed the numerical range defined by the initial values of the QoS parameters. As a result, it is able to match the service provided to the terminal with the QoS that should have been possessed thereby in the case that the terminal is served by the MeNB and the SeNB, thereby to control the QoS of the terminal and improve the service flow transmission quality of the terminal as well as the business performance.

Sixth Embodiment

Figure 12A:
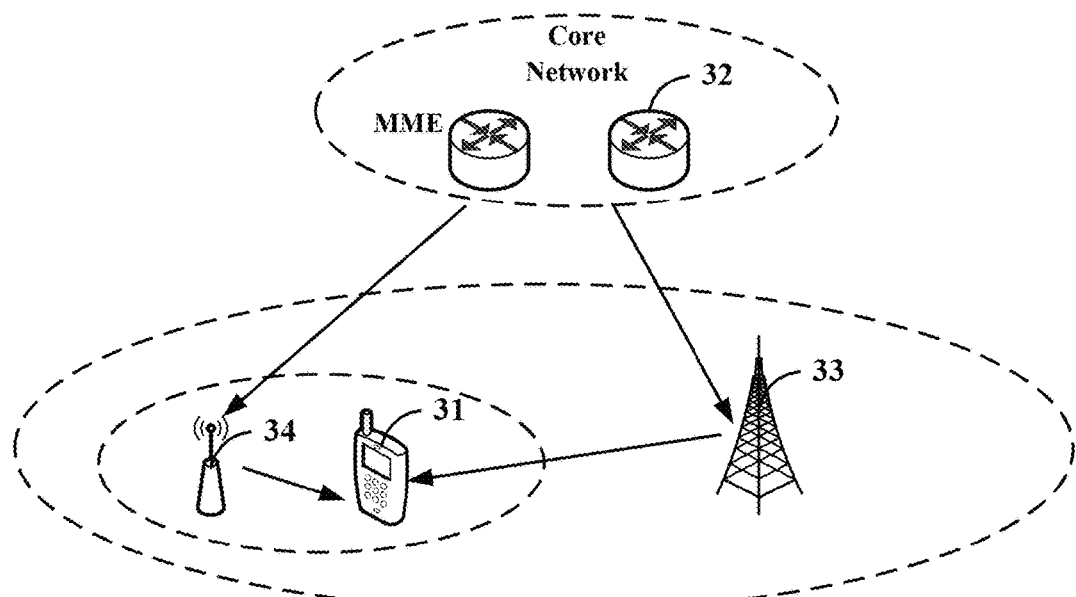
FIG. 12(*a*) is a schematic view showing a QoS management system according to the sixth embodiment of the present disclosure.

The present disclosure further provides in this embodiment a QoS management system for implementing the method in the first or second embodiment. As shown in FIG. 12(a), the QoS management system may include a terminal 31, a network control entity 32, and an MeNB 33 and an SeNB 34 for providing services to the terminal 31.

The network control entity 32 is configured to, with respect to the terminal 31 in a dual-connectivity scenario, acquire initial values corresponding to QoS parameters of the terminal 31; and with respect to any one of the QoS parameters, determine, in accordance with the initial value corresponding to the QoS parameter, QoS parameter thresholds corresponding to the QoS parameter and capable of being used by the MeNB 33 and the SeNB 34, so that the MeNB 33 and the SeNB 34 use respective QoS parameter values within respective numerical ranges defined by the respective QoS parameter thresholds corresponding to the QoS parameter to provide corresponding services to the terminal. A sum of the determined QoS parameter thresholds corresponding to the QoS parameter and capable of being used by the MeNB 33 and the SeNB 34 does not exceed a numerical range defined by the initial value corresponding to the QoS parameter.

Figure 12B:
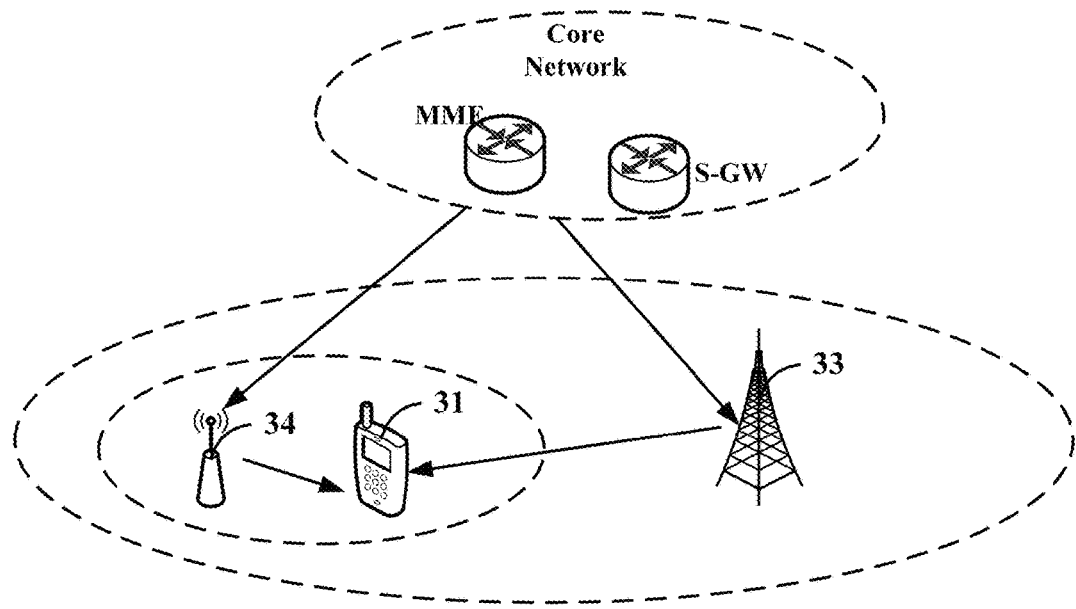

It should be appreciated that, the network control entity 32 in this embodiment may be an independent device (e.g., the MeNB 33 or an SGW of a core network that provides services to the terminal), or a device integrated into the independent device. In the case that the network control entity 31 is the MeNB 33 (i.e., the network control entity 31 is integrated into the MeNB 33), the structure of the QoS management system is shown in FIG. 12(b).

Alternatively, the QoS management system in this embodiment may further include a network element of the core network, such as an MME. In addition, the structures and functions of the network control entity 32 and the MeNB 33 (or SeNB 34) which does not have the functions of the network control entity 32, may be similar to those of the network control entity and the base station in the fourth and fifth embodiments respectively. Furthermore, in the case that the network control entity 32 is the MeNB 33, i.e., the MeNB 33 has the functions of the network control entity 32, the MeNB 33 may further include the functions and the structure of the network control entity in the fourth embodiment.

According to the QoS management system in the sixth embodiment of the present disclosure, with respect to the terminal in the dual-connectivity scenario, the QoS parameter thresholds corresponding to the QoS parameters may be re-allocated to the MeNB and the SeNB for the terminal in accordance with the acquired initial values corresponding to the QoS parameters of the terminal, so as to ensure that the QoS parameter values finally acquired by the terminal and corresponding to the QoS parameters do not exceed the numerical range defined by the initial values of the QoS parameters. As a result, it is able to match the service provided to the terminal with the QoS that should have been possessed thereby in the case that the terminal is served by the MeNB and the SeNB, thereby to control the QoS of the terminal and improve the service flow transmission quality of the terminal as well as the business performance.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc Read-Only Memory (CD-ROM) and optical memory) including computer-readable program codes.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

What is claimed is:

1. A Quality of Service (QoS) management method, comprising steps of:
   with respect to a terminal in a dual-connectivity scenario, acquiring, by a network control entity, initial values corresponding to QoS parameters of the terminal; and
   with respect to any one of the QoS parameters, determining, in accordance with the initial value corresponding to the QoS parameter, QoS parameter thresholds corresponding to the QoS parameter and capable of being used by a Master evolved NodeB (MeNB) and a Slave evolved NodeB (SeNB) which provide services to the terminal,
   wherein a sum of the determined QoS parameter thresholds corresponding to the QoS parameter and capable of being used by the MeNB and the SeNB does not exceed a numerical range defined by the initial value corresponding to the QoS parameter.

2. The QoS management method according to claim 1, wherein the step of acquiring the initial values corresponding to the QoS parameters of the terminal comprises:
   acquiring the initial values corresponding to the QoS parameters of the terminal from a network entity for storing therein terminal subscription data and service types.

3. The QoS management method according to claim 1, wherein the step of, with respect to any one of the QoS parameters, determining the QoS parameter thresholds corresponding to the QoS parameter and capable of being used by the MeNB and the SeNB in accordance with the acquired initial value corresponding to the QoS parameter comprises:
   with respect to any one of the QoS parameters, designating for the MeNB and the SeNB the QoS parameter thresholds corresponding to the QoS parameter and capable of being used by the MeNB and the SeNB in accordance with the acquired initial value corresponding to the QoS parameter; or
   with respect to any one of the QoS parameters, designating for one of the MeNB and the SeNB the QoS parameter threshold corresponding to the QoS parameter and capable of being used by the one of the MeNB and the SeNB in accordance with the acquired initial value corresponding to the QoS parameter, and determining the QoS parameter threshold corresponding to the QoS parameter and capable of being used by the other one of the MeNB and the SeNB in accordance with the designated QoS parameter threshold and the initial value corresponding to the QoS parameter; or
   with respect to any one of the QoS parameters, receiving from the MeNB and the SeNB the QoS parameter thresholds corresponding to the QoS parameter and capable of being used by the MeNB and the SeNB, and taking the received QoS parameter thresholds as the QoS parameter thresholds corresponding to the QoS parameter and capable of being used by the MeNB and the SeNB; or
   with respect to any one of the QoS parameters, receiving from one of the MeNB and the SeNB the QoS parameter threshold corresponding to the QoS parameter and capable of being used by the one of the MeNB and the SeNB, and determining the QoS parameter threshold corresponding to the QoS parameter and capable of being used by the other one of the MeNB and the SeNB in accordance with the received QoS parameter threshold and the initial value corresponding to the QoS parameter.

4. The QoS management method according to claim 1, further comprising:
   with respect to any one of the QoS parameters, in the case that a QoS parameter value corresponding to the QoS parameter and currently used by one of the MeNB and the SeNB exceeds a numerical range defined by the QoS parameter threshold corresponding to the QoS parameter and capable of being used by the one of the MeNB and the SeNB, sending a first notification message to the other one of the MeNB and the SeNB, so as to instruct the other one of the SeNB to, in accordance with the first notification message, adjust a QoS parameter value corresponding to the QoS parameter and currently used by the other one of the MeNB and the SeNB in such a manner that a sum of the adjusted QoS parameter values corresponding to the QoS parameter and currently used by the MeNB and the SeNB does not exceed the numerical range defined by the initial value corresponding to the QoS parameter; or
   receiving a second notification message from one of the MeNB and the SeNB, so as to instruct the other one of the MeNB and the SeNB to, in accordance with the second notification message, adjust the QoS parameter value corresponding to the QoS parameter and currently used by the other one of the MeNB and the SeNB in such a manner that a sum of the adjusted QoS parameter values corresponding to the QoS parameter and currently used by the MeNB and the SeNB does not exceed the numerical range defined by the initial value corresponding to the QoS parameter, wherein the second notification message is sent to the network control entity in the case that the one of the MeNB and the SeNB determines that the QoS parameter value corresponding to the QoS parameter and currently used by the one of the MeNB and the SeNB exceeds the numerical range defined by the QoS parameter threshold corresponding to the QoS parameter and capable of being used by the one of the MeNB and the SeNB.

5. The QoS management method according to claim 4, wherein a QoS parameter-value adjustment amount or adjustment step size is carried in the first notification message, and the step of sending the first notification message to the other one of the MeNB and the SeNB so as to instruct the other one of the MeNB and the SeNB to, in accordance with the first notification message, adjust the QoS parameter value corresponding to the QoS parameter and currently used by the other one of the MeNB and the SeNB comprises:
   sending the first notification message to the other one of the MeNB and the SeNB, so as to instruct the other one of the MeNB and the SeNB to adjust the QoS parameter value corresponding to the QoS parameter and currently used by the other one of the MeNB and the SeNB in accordance with the QoS parameter-value adjustment amount or adjustment step size carried in the first notification message, and
   a QoS parameter-value adjustment amount or adjustment step size is carried in the second notification message, and the step of receiving the second notification message from the one of the MeNB and the SeNB so as to instruct the other one of the MeNB and the SeNB to, in accordance with the second notification message, adjust the QoS parameter value corresponding to the QoS parameter and currently used by the other one of the MeNB and the SeNB comprises:
   receiving the second notification message from the one of the MeNB and the SeNB, so as to instruct the other one of the MeNB and the SeNB to adjust the QoS parameter value corresponding to the QoS parameter and currently used by the other one of the MeNB and the SeNB in accordance with the QoS parameter-value adjustment amount or adjustment step size carried in the second notification message.

6. The QoS management method according to claim 3, wherein with respect to any one of the QoS parameters representing a data transmission characteristic in a downlink direction, the step of determining the QoS parameter thresholds corresponding to the QoS parameter and capable of being used by the MeNB and the SeNB in accordance with the acquired initial value corresponding to the QoS parameter further comprises:
- in the case that data streams distributed by the MeNB and the SeNB to the terminal are allocated by the MeNB, determining the QoS parameter thresholds corresponding to the QoS parameter and capable of being used by the MeNB and the SeNB in accordance with the data streams received by the MeNB and the SeNB from the MeNB and bit rates of the received data streams; or
- in the case that the data streams distributed by the MeNB and the SeNB to the terminal are allocated by a Serving Gateway (SGW), determining the QoS parameter thresholds corresponding to the QoS parameter and capable of being used by the MeNB and the SeNB in accordance with the data streams received by the MeNB and the SeNB from the SGW and bit rates of the received data streams; or
- in the case that the data streams distributed by the MeNB and the SeNB to the terminal are allocated by the MeNB and the SGW, determining the QoS parameter value corresponding to the QoS parameter and capable of being used by the SeNB in accordance with the overall data streams received by the SeNB from the SGW and the MeNB and an overall bit rate of the received overall data streams, and determining the QoS parameter threshold corresponding to the QoS parameter and capable of being used by the MeNB in accordance with the data streams received by the MeNB from the SGW, a bit rate of the received data streams from the SGW, the data streams allocated by the MeNB to the SeNB and a bit rate of the data streams allocated to the SeNB.

7. The QoS management method according to claim 1, wherein the QoS parameters comprise one or more of User Equipment-Aggregate Maximum Bit Rate (UE-AMBR), Maximum Bit Rate (MBR) and Granted Bit Rate (GBR).

8. The QoS management method according to claim 1, wherein the network control entity is the MeNB or the SGW.

9. A Quality of Service (QoS) management method, comprising steps of:
- with respect to a terminal in a dual-connectivity scenario, acquiring, by a base station which provides services to the terminal, QoS parameter thresholds corresponding to QoS parameters of the terminal, capable of being used by the base station and determined by a network control entity for the base station; and
- with respect to any one of the QoS parameters, providing, in accordance with the QoS parameter threshold corresponding to the QoS parameter, capable of being used by the base station and determined by the network control entity for the base station, a corresponding service to the terminal using a QoS parameter value within a numerical range defined by the QoS parameter threshold corresponding to the QoS parameter and capable of being used by the base station,
- wherein a sum of the QoS parameter threshold corresponding to the QoS parameters, capable of being used by the base station and determined by the network control entity for the base station, and a QoS parameter threshold corresponding to the QoS parameter, capable of being used by a further base station which cooperates with the base substation to provide a service to the terminal, and determined by the network control entity for the further base station, does not exceed a numerical range defined by an initial value corresponding to the QoS parameter of the terminal acquired by the network control entity.

10. The QoS management method according to claim 9, wherein prior to the step of, with respect to any one of the QoS parameters, acquiring by the base station the QoS parameter threshold corresponding to the QoS parameter, capable of being used by the base station and determined by the network control entity for the base station, the QoS management method further comprises:
- returning to the network control entity the QoS parameter threshold corresponding to the QoS parameter and capable of being used by the base station.

11. The QoS management method according to claim 9, further comprising:
- receiving the first notification message from the network control entity, so as to adjust, in accordance with the first notification message, the QoS parameter corresponding to the QoS parameter and currently used by the base station in such a manner that a sum of the adjusted QoS parameter values corresponding to the QoS parameter and currently used by the base station and the further base station does not exceed the numerical range defined by the initial value corresponding to the QoS parameter, wherein the first notification message is sent by the network control entity to the base station in the case that the QoS parameter value corresponding to the QoS parameter and currently used by the further base station exceeds the QoS parameter threshold corresponding to the QoS parameter and capable of being used by the further base station; or
- with respect to any one of the QoS parameters, in the case that the QoS parameter value corresponding to the QoS parameter and currently used by the base station exceeds the numerical range defined by the QoS parameter threshold corresponding to the QoS parameter and capable of being used by the base station, sending the second notification message to the network control entity, so as to instruct by the network control entity the further base station to adjust the QoS parameter value corresponding to the QoS parameter and currently used by the further base station in such a manner that the sum of the adjusted QoS parameter values corresponding to the QoS parameter and currently used by the base station and the further base station does not exceed the numerical range defined by the initial value corresponding to the QoS parameter.

12. The QoS management method according to claim 11, wherein a QoS parameter-value adjustment amount or adjustment step size is carried in the first notification message, and the step of receiving the first notification message from the network control entity so as to adjust the QoS parameter value corresponding to the QoS parameter and currently used by the base station in accordance with the first notification message comprises:
- receiving the first notification message from the network control entity, so as to adjust the QoS parameter value corresponding to the QoS parameter and currently used by the base station in accordance with the QoS parameter-value adjustment amount or adjustment step size carried in the first notification message, and a QoS parameter-value adjustment amount or adjustment step size is carried in the second notification message, and the step of sending the second notification message to the network control entity so as to instruct by the network control entity the further base station to adjust the QoS parameter value corresponding to the QoS parameter and currently used by the further base station comprises:

sending the second notification message to the network control entity so as to instruct by the network control entity the further base station to adjust the QoS parameter value corresponding to the QoS parameter and currently used by the further base station in accordance with the QoS parameter-value adjustment amount or adjustment step size carried in the second notification message.

13. A network control entity, comprising:
an acquisition circuit configured to, with respect to a terminal in a dual-connectivity scenario, acquire initial values corresponding to Quality of Service (QoS) parameters of the terminal; and
a determination circuit configured to, with respect to any one of the QoS parameters, determine, in accordance with the initial value corresponding to the QoS parameter, QoS parameter thresholds corresponding to the QoS parameter and capable of being used by a Master evolved NodeB (MeNB) and a Slave evolved NodeB (SeNB) which provide services to the terminal,
wherein a sum of the determined QoS parameter thresholds corresponding to the QoS parameter and capable of being used by the MeNB and the SeNB does not exceed a numerical range defined by the initial value corresponding to the QoS parameter.

14. A base station, comprising:
an acquisition circuit configured to, with respect to a terminal in a dual-connectivity scenario, acquire Quality of Service (QoS) parameter thresholds corresponding to QoS parameters of the terminal, capable of being used by the base station, and determined by a network control entity for the base station; and
an execution circuit configured to, with respect to any one of the QoS parameter, provide, in accordance with the QoS parameter threshold corresponding to the QoS parameter, capable of being used by the base station, and determined by the network control entity for the base station, a corresponding service to the terminal using a QoS parameter value within a numerical range defined by the QoS parameter threshold corresponding to the QoS parameter and capable of being used by the base station,
wherein a sum of the QoS parameter threshold corresponding to the QoS parameter, capable of being used by the base station, and determined by the network control entity for the base station, and a QoS parameter threshold corresponding to the QoS parameter, capable of being used by a further base station which cooperates with the base substation to provide a service to the terminal, and determined by the network control entity for the further base station, does not exceed a numerical range defined by an initial value corresponding to the QoS parameter of the terminal acquired by the network control entity.

15. A Quality of Service (QoS) management system, comprising a terminal, a network control entity, and a Master evolved NodeB (MeNB) and a Slave evolved (SeNB) which provide services to the terminal,
wherein the network control entity is configured to, with respect to a terminal in a dual-connectivity scenario, acquire initial values corresponding to QoS parameters of the terminal; and with respect to any one of the QoS parameters, determine, in accordance with the initial value corresponding to the QoS parameter, QoS parameter thresholds corresponding to the QoS parameter and capable of being used by the MeNB and the SeNB; and
a sum of the determined QoS parameter thresholds corresponding to the QoS parameter and capable of being used by the MeNB and the SeNB does not exceed a numerical range defined by the initial value corresponding to the QoS parameter.

16. The QoS management method according to claim 2, wherein the step of, with respect to any one of the QoS parameters, determining the QoS parameter thresholds corresponding to the QoS parameter and capable of being used by the MeNB and the SeNB in accordance with the acquired initial value corresponding to the QoS parameter comprises:

with respect to any one of the QoS parameters, designating for the MeNB and the SeNB the QoS parameter thresholds corresponding to the QoS parameter and capable of being used by the MeNB and the SeNB in accordance with the acquired initial value corresponding to the QoS parameter; or with respect to any one of the QoS parameters, designating for one of the MeNB and the SeNB the QoS parameter threshold corresponding to the QoS parameter and capable of being used by the one of the MeNB and the SeNB in accordance with the acquired initial value corresponding to the QoS parameter, and determining the QoS parameter threshold corresponding to the QoS parameter and capable of being used by the other one of the MeNB and the SeNB in accordance with the designated QoS parameter threshold and the initial value corresponding to the QoS parameter; or with respect to any one of the QoS parameters, receiving from the MeNB and the SeNB the QoS parameter thresholds corresponding to the QoS parameter and capable of being used by the MeNB and the SeNB, and taking the received QoS parameter thresholds as the QoS parameter thresholds corresponding to the QoS parameter and capable of being used by the MeNB and the SeNB; or with respect to any one of the QoS parameters, receiving from one of the MeNB and the SeNB the QoS parameter threshold corresponding to the QoS parameter and capable of being used by the one of the MeNB and the SeNB, and determining the QoS parameter threshold corresponding to the QoS parameter and capable of being used by the other one of the MeNB and the SeNB in accordance with the received QoS parameter threshold and the initial value corresponding to the QoS parameter.

17. The QoS management method according to claim 2, further comprising:

with respect to any one of the QoS parameters, in the case that a QoS parameter value corresponding to the QoS parameter and currently used by one of the MeNB and the SeNB exceeds a numerical range defined by the QoS parameter threshold corresponding to the QoS parameter and capable of being used by the one of the MeNB and the SeNB, sending a first notification message to the other one of the MeNB and the SeNB, so as to instruct the other one of the SeNB to, in accordance with the first notification message, adjust a QoS parameter value corresponding to the QoS parameter and currently used by the other one of the MeNB and the SeNB in such a manner that a sum of the adjusted QoS parameter values corresponding to the QoS parameter and currently used by the MeNB and the SeNB does not exceed the numerical range defined by the initial value corresponding to the QoS parameter; or receiving a second notification message from one of the MeNB and the SeNB, so as to instruct the other one of the MeNB and the SeNB to, in accordance with the second notification message, adjust the QoS parameter value corresponding to the QoS parameter and currently used by the other one of the MeNB and the SeNB in such a manner that a sum of the adjusted QoS parameter values corresponding to the QoS parameter and currently used by the MeNB and the SeNB does not exceed the numerical range defined by the initial value corresponding to the QoS parameter, wherein the second notification message is sent to the network control entity in the case that the one of the MeNB and the SeNB determines that the QoS parameter value corresponding to the QoS parameter and currently used by the one of the MeNB and the SeNB exceeds the numerical range defined by the QoS parameter threshold corresponding to the QoS parameter and capable of being used by the one of the MeNB and the SeNB.

18. The QoS management method according to claim 2, wherein the QoS parameters comprise one or more of User Equipment-Aggregate Maximum Bit Rate (UE-AMBR), Maximum Bit Rate (MBR) and Granted Bit Rate (GBR).

19. The QoS management method according to claim 2, wherein the network control entity is the MeNB or the SGW.

20. The QoS management method according to claim 10, further comprising:

receiving the first notification message from the network control entity, so as to adjust, in accordance with the first notification message, the QoS parameter corresponding to the QoS parameter and currently used by the base station in such a manner that a sum of the adjusted QoS parameter values corresponding to the QoS parameter and currently used by the base station and the further base station does not exceed the numerical range defined by the initial value corresponding to the QoS parameter, wherein the first notification message is sent by the network control entity to the base station in the case that the QoS parameter value corresponding to the QoS parameter and currently used by the further base station exceeds the QoS parameter threshold corresponding to the QoS parameter and capable of being used by the further base station; or with respect to any one of the QoS parameters, in the case that the QoS parameter value corresponding to the QoS parameter and currently used by the base station exceeds the numerical range defined by the QoS parameter threshold corresponding to the QoS parameter and capable of being used by the base station, sending the second notification message to the network control entity, so as to instruct by the network control entity the further base station to adjust the QoS parameter value corresponding to the QoS parameter and currently used by the further base station in such a manner that the sum of the adjusted QoS parameter values corresponding to the QoS parameter and currently used by the base station and the further base station does not exceed the numerical range defined by the initial value corresponding to the QoS parameter.

* * * * *